April 9, 1963 R. H. THORNER 3,084,758
FLUID PRESSURE SENSING GOVERNOR MECHANISM
Filed Sept. 11, 1957 6 Sheets-Sheet 2
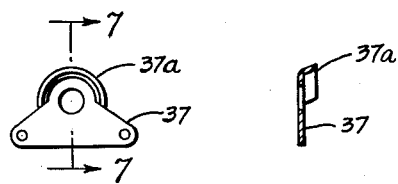
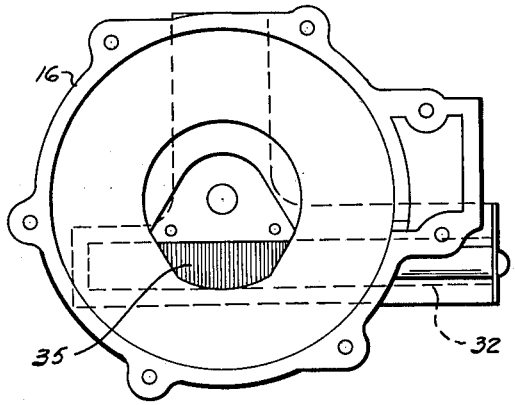
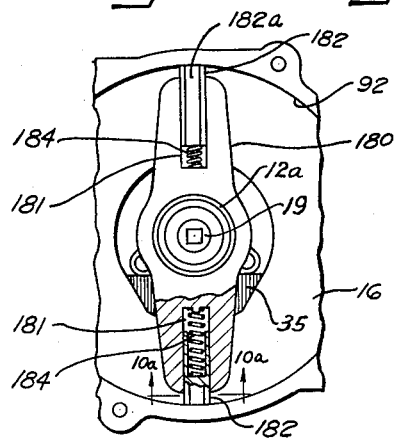
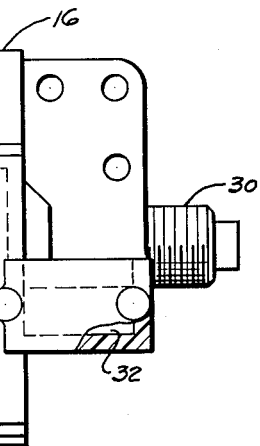
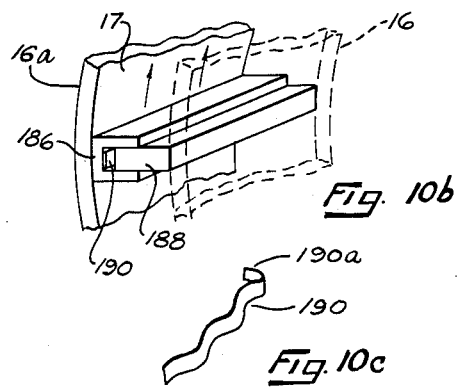
INVENTOR.
ROBERT H. THORNER
BY
ATTORNEYS

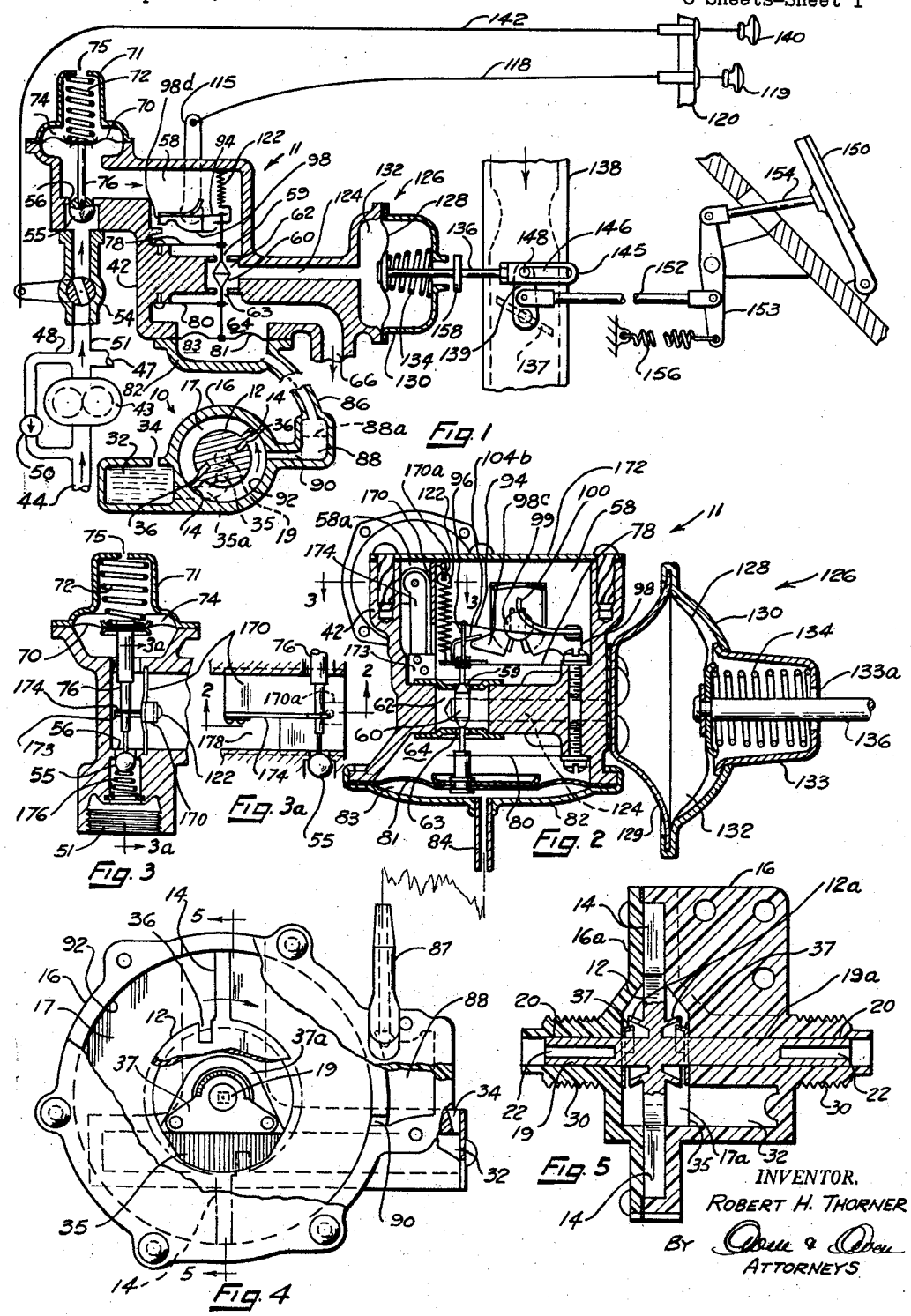

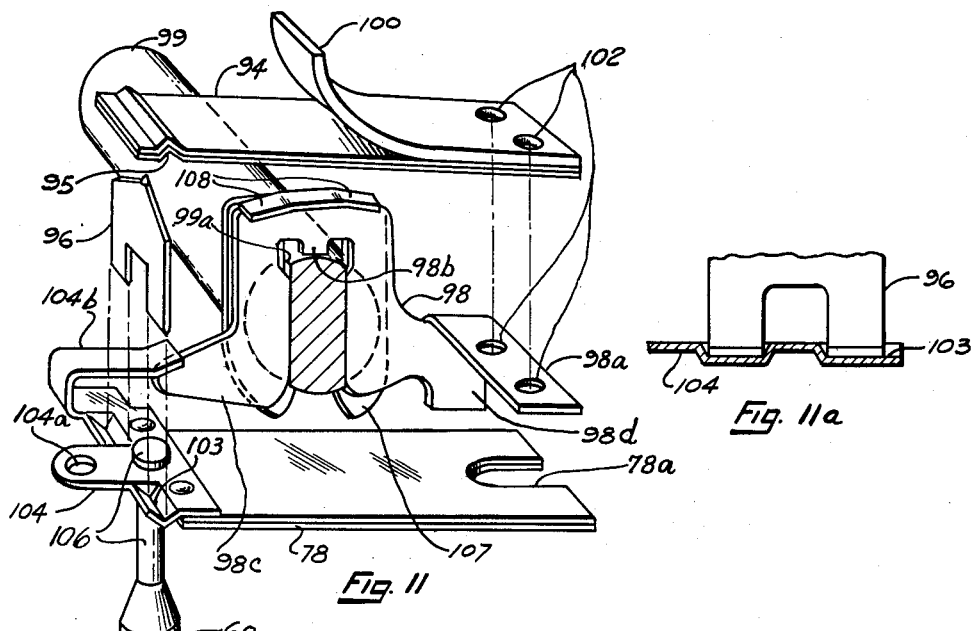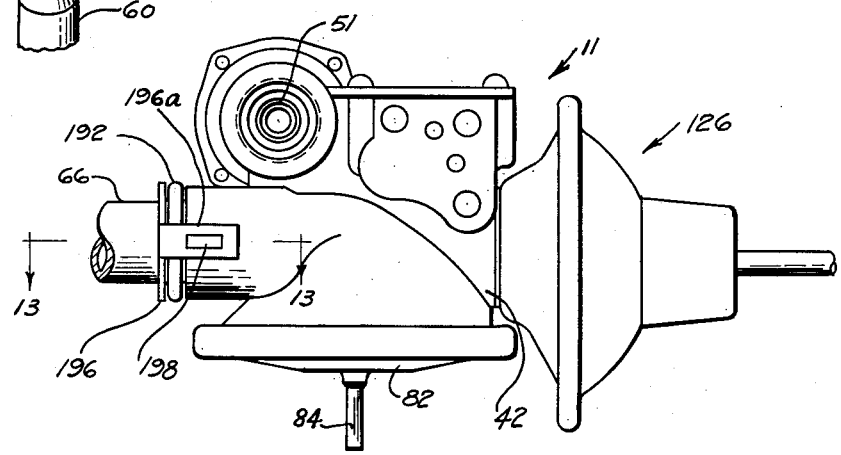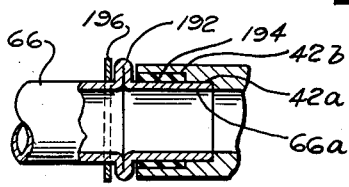

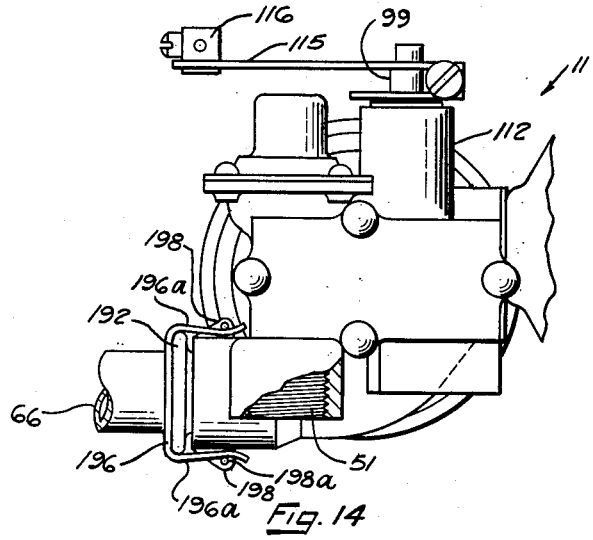
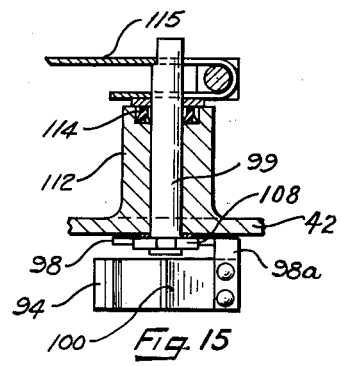
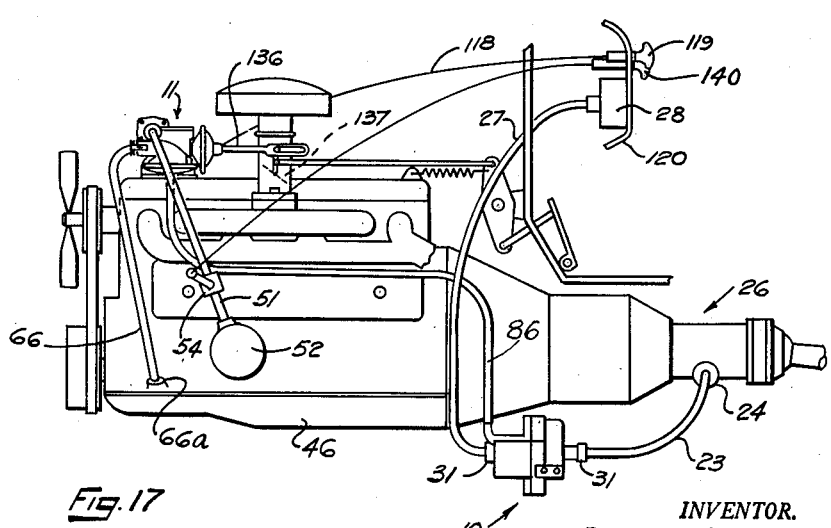

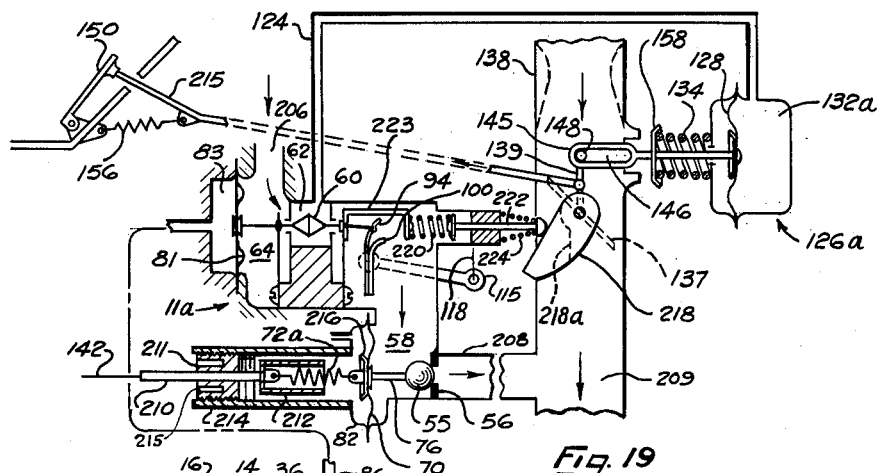

April 9, 1963
R. H. THORNER
3,084,758
FLUID PRESSURE SENSING GOVERNOR MECHANISM
Filed Sept. 11, 1957
6 Sheets-Sheet 6
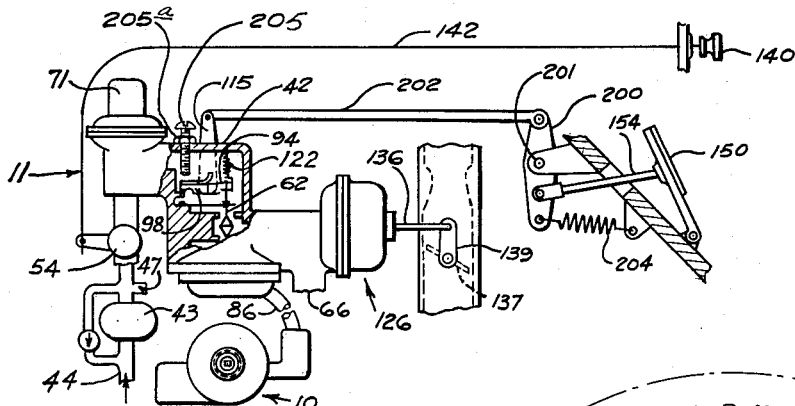
Fig. 18
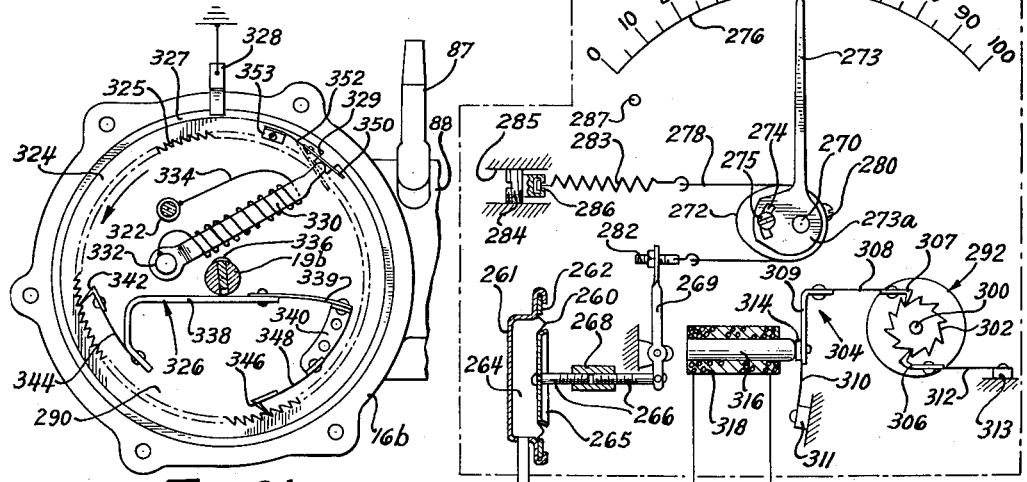
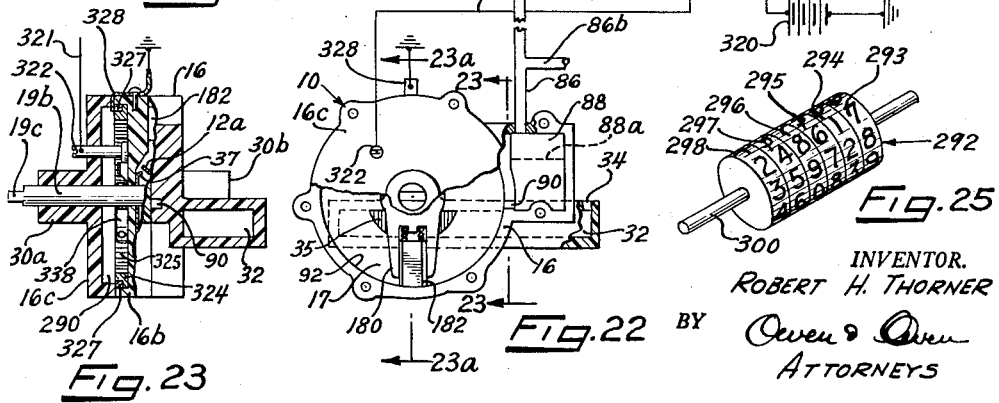
INVENTOR.
ROBERT H. THORNER
BY Owen & Owen
ATTORNEYS United States Patent Office 3,084,758
Patented Apr. 9, 1963

3,084,758
FLUID PRESSURE SENSING GOVERNOR MECHANISM
Robert H. Thorner, 19754 Monte Vista, Detroit, Mich.
Filed Sept. 11, 1957, Ser. No. 683,318
26 Claims. (Cl. 180—82.1)

This invention relates to a governor for controlling the speed of a rotating machine and particularly for controlling the speed of an engine in relation to the speed of the engine itself or, in the case of automotive vehicles, in relation to the speed of the vehicle by controlling the engine. This application is for a speed governing apparatus analogous to those disclosed in my copending applications Serial No. 291,381, filed June 3, 1952, entitled "Fluid Operated Speed Governor," and now Patent No. 2,995,898; Serial No. 543,831, filed October 31, 1955, entitled "Governor Device," and now Patent No. 2,835,237; and Serial No. 567,270, filed February 23, 1956, entitled "Engine Governor," and now Patent No. 2,887,998.

Governors have been used extensively for controlling the speed of various types of engines and the speed of automotive vehicles. In order to meet the varied requirements of all the different applications of governors, a comparatively large number of types and designs thereof have been necessary. For example, for the control of trucks and other automotive vehicles to limit the speed thereof, vacuum and velocity governors have been widely used primarily because of their low cost since no special drive is required for them. However, vacuum governors offered commercially in the past have had serious drawbacks, such as loss of engine power, sensitivity to the effects of dirt and gum, lack of speed range and general unreliability. Mechanical centrifugal governors and hydraulic servo-governors have been used to a lesser extent for speed-limiting governors on trucks, but the high cost in view of the necessity for protective casings to prevent tampering, and the necessity for a separate rotary speed drive have limited their use although they generally have provided better performance than commercially available vacuum governors.

In all forms of speed limiting governors for trucks, passenger cars, and industrial engines, the friction of the carburetor throttle is such that the forces developed by the governor have been insufficient to provide stability in the absence of anti-friction bearings to support the throttle shaft. For a number of years a so-called "sandwich" throttle unit was interposed between the carburetor and the engine on the downstream side of the carburetor throttle and included its own separate governor throttle mounted on proper bearings. In this type of governor installation the carburetor throttle is open normally and when the pre-set governed speed is attained, the governor throttle automatically closes sufficiently to maintain the engine speed at the desired limited value. With the development of high-speed engines of much higher power (and air flow), the "sandwich" governor construction has become objectionable because it seriously disturbs the carburetion and particularly the fuel distribution. Also, the hood clearances of many automotive vehicles have been lowered to such an extent as to preclude the use of the "sandwich" type governor. Moreover, the carburetor linkages and studs all must be revised to accommodate a "sandwich" governor.

In more recent years to overcome the objections of the "sandwich" construction, governors have been "built-in" as an integral part of the carburetor to actuate the normal carburetor throttle. However, a special carburetor must be provided to include anti-friction bearings for throttle shaft and an override mechanism for permitting the accelerator to control the throttle (and accelerating pump) up to the governed speed. When this speed is attained the governor must move the throttle away from the accelerator-controlled linkage to close the throttle sufficiently to limit the speed. Because of the friction of the accelerating pump, it is not connected to operate with the governor mechanism, so that during governor operation the acceleration pump is inoperative, which differs from normal operation without a governor. Also, the construction is costly since the special anti-friction bearings and override mechanism must be used. Furthermore, the trend in automotive vehicles is to make the air cleaner "surround" the carburetor in view of the lower hood clearances now used. Hence, in these engines there is no room to install a governor at the side of a carburetor, so that even a "built-in" governor-carburetor combination cannot be used. This is a significant consideration since it appears that automotive hoods will be even lower in future years.

Governors are also used on *all* farm tractors for a different purpose than for trucks as will be explained. In this application, the operator's control is connected to actuate the speeder spring of the governor, and the governor in turn actuates the carburetor throttle to control automatically the speed of the engine. Thus, for farm tractors, a governor is used not as a speed limiting device, but as an automatic throttle to keep the tractor at constant engine speed over all terrain to permit the farmer to watch his implements while driving the tractor. In this application of a governor, the centrifugal-mechanical type has been the most widely used. The cost of this type of governor is influenced by the necessity for a special governor drive in the tractor. Also, these governors do not give full power at the controlled speed since they must be made at such low cost that antifriction bearings and precision grinding of interfitted parts are not practicable from the standpoint of cost. Moreover in order to reduce costs the linkages from the governor mechanism and the throttle are completely exposed in some tractors with the attendant danger of twigs or dirt interferring with governor operation. Larger tractors have these linkages encased in cast iron housings to avoid this danger, but of course at a much higher cost. Vacuum or velocity governors are not satisfactory in tractors because of the large amount of prevailing dirt and dust in the air around farm lands and (in presently available units) because of power loss at full load as well as their general unreliability and lack of proper speed regulation.

Governors for diesel engines, particularly of the smaller types such as used for speed limitation in diesel powered trucks, have substantially the same requirements as for gasoline powered trucks. Since carburetors are not used in diesel engines, vacuum governors cannot be used so that most of the automotive diesel engines use mechanical centrifugal governors with linkages to the fuel pump controls. As discussed above, these governors have the inherent problems of a special engine drive as well as the problem of friction in the governor mechanism and linkages which limits regulation and responsiveness of the governor in view of the cost limitation for automotive or truck use.

Another application for governors is for an automatic throttle for passenger cars. For this application, the governor is used to maintain automatically any speed selected by the driver and eliminates the tiresome necessity of using his foot to hold the accelerator. In view of the current large turnpike or express-highway program, such devices should find extensive use in future years. A governor for this application preferably should control the engine in response to the speed of the vehicle and should have a wide range of speed selection. Safety of operation is extremely important for such governors so that the basic mechanism must be reliable, and it must be possible to exceed the preselected governor speed merely by depressing the accelerator. Also, simple and safe control mechanism must be provided to release the governor and instantly return the engine to normal conditions incident to normal operation of the brake pedal.

The automatic throttle application of governors is plagued with many severe problems. First, it is highly desirable that the mechanism be adaptable to standard automobile carburetors and their linkages in order to produce a low-cost unit, and to facilitate installation merely by addition to standard automotive vehicles. As explained above, the space around the carburetors of present-day automobiles has been so severely limited by the low hood clearances that a "sandwich" type governor and even a "built-in" carburetor-governor combination is not feasible.

In view of the desirability for the governor to operate the standard carburetor (and even its linkages connecting with and including the accelerator) for reasons discussed above, a comparatively large actuating force must be developed by the governor. In combination with this requirement, other problems are presented by the desirability of sensing road speed rather than engine speed. The only road-speed-functional drive which is available in all automotive vehicles is provided for the speedometer. The prior art shows several devices for using the speedometer flexible shaft as a governor drive for automatic-throttle installations. If a direct mechanical governor is driven by the speedometer flexible shaft, the governor would be too large to produce the necessary large forces without excessively overloading the drive, and torsional whip would lead to breakage of the flexible shaft. Also, in such an installation another "jumper" flexible shaft must be provided from the governor to the speedometer, and the added bends in the two sections of the speedometer shafting are highly undesirable since a normal speedometer shaft installation without a governor is critical at best from a bending standpoint. If the bends are not worked out correctly, the shafts are noisy and frequently break. In order to provide sufficient forces to work the throttle (and preferably its linkage mechanism), a servo-type governor having a pilot valve and a fluid servo-motor may be used. However, if a centrifugal fly-weight signal system driven by the speedometer shaft is used, the pilot valve must be made a part of the fly-weight in order to reduce friction in their co-action. If this type of signal unit is installed in the vicinity of the engine, then the problem of overbending of the speedometer shafting is present, and the effects of any torsional whip in the flexible shafting are amplified by the servo-motor. As an alternative, if this signal unit is installed adjacent the drive for the speedometer shaft (at the bottom of the transmission) then all the tubes carrying the working fluid for the servo-motor must be extended to this unit at considerable distance from most available sources of fluid power (at the engine).

In addition, fluid servo-governors using a conventional sliding or spool-type pilot valve are subjected to friction due to the sliding of the valve which is further subjected to dirt, gum, etc. wedging in between the close fitting surfaces thereof. Hence these governors must have a sensing unit large enough to produce sufficient actuating forces for the pilot valve to overcome such undesirable friction and produce stability with good regulation. The use of engine oil or liquid from a power steering pump for example, would be difficult in this respect since the higher pressures acting on the pilot valve tend to increase friction and the wedging tendencies of dirt and the like. As discussed above, in order to use road-speed sensing by means of the speedometer flexible shaft a very small and light signal or sensing unit of the servo-governor should be used, and this unit further should have minimum mass and torsional drag to reduce whip or torsional oscillation.

As above recited, each of a number of types of governors has been used for certain applications, but cannot be used for others. For example, the vacuum and velocity governors which have been the most widely used in the gasoline truck market because of their lack of a separate speed drive, have never been used for diesel-truck or farm-tractors, and probably would not be used for automatic throttle operation because vacuum governors are solely engine-speed sensing and are difficult to install in passenger cars, among other reasons.

A primary object of the present invention is to provide a fluid servo-governor device for a machine or engine in which substantially a single type or design of governor can be adapted for use in all of the above mentioned governor applications by primarily changing only the arrangement of controls of the governor, and in which governor any fluid (gas or liquid) under pressure or vacuum which is readily available in the engine or machine may be used as a source of fluid power for the servo-mechanism of the governor, and further in which governor all of the above objections to all of the above mentioned types of governors are overcome.

Another object of the present invention is to provide a governor having means to produce a liquid pressure varying with speed, which pressure is sensed or detected by a fluid-powered servo-governor of the type recited in the foregoing paragraph and in which the inventive combination includes a frictionless pressure sensing or detecting mechanism (including the pilot valve) to facilitate vastly improved performance, whereby the size of the governor and particularly the signal unit may be small so that available drives having limited torque outputs may be used without the provision of a special governor drive.

A further object of the present invention is to provide a governor as recited in the preceding paragraph in which the governor includes, in the inventive combination, pressure regulator means to control the fluid pressures entering the governor irrespective of variations of the pressure of the working fluid, thereby permitting the use of any available working fluid (such as gas or air under pressure or vacuum) as a source of servo-fluid pressure.

Still another object of the present invention is to provide a basic governor system as discussed in the foregoing paragraphs which may be installed in any type of engine such as gasoline, diesel, gas turbines, etc., particularly but not exclusively for automotive applications, without revision of the engine fuel metering system and without provision of anti-friction means to support carburetor throttle shafts etc., the governor being adapted to operate the normal fuel-controlling-means or other means to control the engine normally provided therefor without a governor, and which governor in automotive applications may be connected sufficiently remote from the engine-controlling-means to permit satisfactory installation in view of the small hood clearances and resulting limited space surrounding the fuel-controlling-means.

An additional object of the present invention is to provide, in a governor mechanism, a sensing or detecting means which will produce a signal-force which increases with speed at a rate greater than linear, together with means including a novel "speeder spring" and control system therefor which tends to compensate for the non-linearity of the signal force vs. speed relationship, whereby improved regulation may be obtained throughout a wide range of governed speeds.

Another object of the present invention is to provide in a fluid servo-governor or for other applications, novel pressure generating means having self-contained liquid for producing a liquid pressure varying with the rotary speed of the driving means, and which generator means includes novel means to convert the liquid pressure developed by the generator means to air pressure for facilitating remote installation of the servo-mechanism of the governor or other mechanisms subjected to the converted air pressure.

A further object of the present invention is to provide in a pressure generator having self-contained liquid to produce pressure as recited in the foregoing paragraph, novel means to prevent leakage of the fluid without the use of shaft seals such as would add to the torsional resistance of the unit, whereby the generator may be driven by flexible shafts such as used in speedometer and tachometer drives, for example.

Another object of the present invention is to provide, with a governor having a pressure generator as recited in the preceding two paragraphs, particularly when the governor is adapted as an automatic throttle, means to operate an alarm system such as a horn, bell, buzzer, etc., when the pre-selected governed speed is exceeded, or even to shut off the engine until the speed returns to the governed value.

Other objects and advantages of the invention will become apparent from the following description, and from the accompanying drawings, in which—

FIG. 1 is a schematic or diagrammatic view of one form of the governor including automatic throttle mechanism;

FIG. 2 is a sectional view of the servo unit of the governor showing a modified regulator valve arrangement;

FIG. 3 is a sectional view taken substantially along the line 3—3 in FIG. 2;

FIG. 3a is a partial sectional view along line 3a—3a in FIG. 3;

FIG. 4 is a fragmentary assembly view of a pressure generator of the governor with a portion of the casing and a portion of the rotor and vane element of the generator broken away;

FIG. 5 is a central vertical sectional view of the pressure generator taken on line 5—5 of FIG. 4;

FIG. 6 is an elevational view of one of a pair of baffles provided to prevent leakage of oil from the pressure generator;

FIG. 7 is a sectional view of the baffle taken on line 7—7 in FIG. 6;

FIG. 8 is an elevational view of the main housing of the pressure generator unit with the rotor and vane removed;

FIG. 9 is a side elevational view of the pressure generator unit with parts broken away to show the construction of the chamber for transmitting generated pressure;

FIG. 10 is a fragmentary elevation, with parts broken away of the generator, rotor and vane construction;

FIG. 10a is a section on line 10a—10a of FIG. 10, with the parts shown in perspective to delineate the cross-sectional form of the vane;

FIG. 10b is a perspective view showing a modified form of vane;

FIG. 10c is a perspective view of a backing spring used in conjunction with the vane of FIG. 10b;

FIG. 11 is an exploded, fragmentary view of the "speeder spring" assembly;

FIG. 11a is a detailed constructional view of certain of the parts of FIG. 11 brought into juxtaposition;

FIG. 12 is a side elevation of the servo-unit assembly;

FIG. 13 is a detailed sectional view of the connection of the fluid outlet tube of the control unit on line 13—13 in FIG. 12;

FIG. 14 is a top view of the servo-unit assembly with parts broken away;

FIG. 15 is a fragmentary horizontal sectional view of a portion of the speeder spring assembly shown in FIG. 14;

FIGS. 16a and 16b are respectively elevational and side view of the locking clip assembly shown in FIG. 11;

FIG. 17 is an illustrative installation of the governor on an engine connected, by way of example, as an automatic throttle using engine oil as the power fluid;

FIG. 18 is a schematic drawing of the governor as it would be connected in trucks and farm tractors;

FIG. 19 is a schematic view of the governor as arranged to use air under vacuum as the servo-fluid shown connected by way of example for automatic throttle operation;

FIGS. 20 and 21 show means for using the outlet air pressure from the generator unit to actuate a signal device to warn the driver of excess speed or momentarily to shut off the engine when the governed speed has been exceeded;

FIG. 20a is a schematic and fragmentary view of a mechanism similar to that shown in FIG. 20 but adapted to close the circuit to a horn or other audible warning signal;

FIG. 22 is a diagrammatic view showing means to use the pressure generator of the present invention to operate a speedometer mechanism;

FIG. 23 is a sectional view, with parts broken away, taken on line 23—23 of FIG. 22, a portion of the view being shown as a central vertical section on line 23a—23a of FIG. 22;

FIG. 24 is an interior elevational view of the mechanism shown in FIG. 23 with the end housing removed; and FIG. 25 is a detailed elevational view of an odometer wheel.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not for limitation.

In the primary inventive concept of the present invention, a novel fluid pressure generator is provided comprising in the forms shown, a very small centrifugal-liquid unit preferably only partially filled with liquid such as oil, and having rotary vane means driven by the transmission or engine to produce a fluid pressure varying with road or engine speed as desired, and in the form shown including a novel baffle arrangement to prevent the liquid from leaking out. In such construction a pressure converter or transmitter preferably is provided to convert the liquid pressure to gas or air pressure, so that a control unit having a sensing diaphragm subjected to this gas pressure may be connected at any desired distance from the generator by suitable tubing or hose without the problem of filling the entire tube and diaphragm chamber with liquid. In furtherance of the inventive concept, the gas actuated sensing diaphragm is connected to actuate a pilot valve suspended within the working fluid for the governor servo-motor by leaf spring means whereby the speed-sensing movements of the pilot valve, its actuating diaphragm, and its biasing means, are frictionless in operation. In this manner the response of the speed-sensing portion of the mechanism is so fast that the governor will produce excellent performance with a very small signal pressure from the generator, whereby the generator itself can be made small and light enough to be driven without difficulty by a flexible shaft normally operated by the vehicle or engine so that no separate governor drive need be provided. With this construction, a fluid servo-motor is connected to produce vastly amplified forces (much greater than could be produced by the signal pressure alone) for actuating the normal engine-controlling means preferably without revision from its use without a governor. Such result is attained according to the inventive concept, by directing any desired working fluid past the pilot valve with sufficient fluid pressure and/or with a servo-motor having sufficient area to minimize percentage-wise any friction in the engine-controlling mechanism; the amount of pressure transmitted to the servo-motor is conmatrolled by movements of the pilot valve which responds to changes in signal pressure with changes in speed to produce speed-correcting movements of the governor system. The inventive combination preferably includes a pressure regulator such as a diaphragm type for example, to maintain accurately controlled pressures of the working fluid at the pilot valve, whereby governor operation will be consistent irrespective of the normal variations in the source pressure, or pressures elsewhere in the working fluid circuit. In such manner, according to the inventive concept, any liquid or gaseous fluid under either pressure or vacuum, may be used in the servo-mechanism, providing the product of servo-motor pressure and area is sufficient to overpower the friction in the engine-controlling mechanism without hysteresis in governor operation. According to an optional part of the inventive concept, when the signal pressure from the generator varies with speed in a function having an exponent greater than one (nonlinear), a compensating speeder spring system may be provided comprising a leaf spring having one end biasing the pilot valve and the other end revolved by the speed control shaft including a guide member controlling the bending of the leaf spring effectively to vary the length (and hence rate) thereof biasing the pilot valve. In this manner the rate increases with speed, thereby tending to produce more uniform speed regulation for a wide range of governed speeds.

In the drawings, FIGS. 1 and 2 through 16 represent schematic and generally structural drawings, respectively, of the governor according to the present invention and the following description will refer to all of these diagrammatic drawings for clarification wherein the elements thereof are numbered correspondingly. FIG. 1 illustrates the governor in the installation of an automatic throttle and shows the servo-motor of the governor using pressure fluid such as engine oil, by way of example, bypassing the normal engine-oil lubricating circuit and flowing from the governor back to the engine sump. FIG. 17 illustrates the installation of the governor of FIGS. 2 through 16 on an engine, as shown diagrammatically in FIG. 1, wherein engine oil is taken from the oil filter and returned to the sump.

Also in the forms shown in FIGS. 1 and 17 by way of example, the governor is illustrated as installed in a reciprocating internal combustion engine to control a conventional butterfly throttle in the intake manifold. The governor principle is unchanged if the servo-motor of the governor actuates the normal fuel-control valve of a gas turbine engine or the metering rack of a diesel engine, or the control valve of a fuel-injection engine, or the control member of a steam engine or pump or any other rotating machine. The governor also includes means to be described that permits the use of any working fluid in the servo-mechanism such as positive air pressure from the air brake pump of trucks or from air springs (pump) in busses and passenger cars; or diesel fuel or engine oil of diesel engines; or oil pressure or cooling water pressure or power steering liquid pressure in trucks, tractors and passenger cars; and engine oil or implement-pump-oil in farm tractors. Also intake manifold vacuum (air) may be used in some installations, particularly for automatic throttle controls.

Although the governor signal unit in FIG. 17 is illustrated as being driven by the flexible shaft from the speedometer drive to obtain road speed sensing, the unit may also be driven by the flexible shaft for tachometers now provided as standard equipment on all diesel trucks and farm tractors and on many gasoline trucks (optional on other gas trucks) in order to control engine speed when desired, or the unit may be driven from any other available or special drive.

Referring now to FIGS. 1–17, and particularly to FIG. 1, the governor may conveniently be considered to be divided into two components. The first component is the "signal or pressure generator unit," generally indicated by the number 10, which also might be termed "sensor" unit, for producing a fluid pressure that varies as a function of the rotary speed of the driving means. The second component may be termed the "servo-unit," generally indicated by the number 11, which accurately amplifies the speed-functional signal produced by the signal or sensor unit to provide sufficient forces to operate the fuel-control-means regardless of the friction therein. FIGS. 4–10, 10a and 10b are views of typical constructions of the pressure generator unit made according to the schematic drawing of FIG. 1, except for minor modifications as will be discussed. FIGS. 2, 3, 3a, 11, 11a, 12, 13, 14, 15 and 16a, 16b are views of typical constructions of the servo-unit made according to the schematic drawing of FIG. 1, except for minor modifications as will be discussed into two components. The first sub-component is the "servo-motor" 12b which may be separately mounted from the remainder of the servo-unit. The remaining portion of the servo-unit comprises the second sub-component and will be referred to herein as the "control-unit" or "brain-unit."

Referring to the pressure generator unit of FIGS. 1, 4 to 9 and 17 which illustrates the application as an automatic throttle, a rotor 12 carrying vanes 14 rotates in a housing the facing halves of which are designated 16, and 16a in FIG. 5. The rotor and housing together form a pressure chamber 17. The rotor is driven by a shaft 19, which may be an integral part of the rotor and is journalled in housing extensions 20 as shown best in FIG. 5. The shaft may be adapted to be driven by any suitable means (at either engine or road speed) but in FIGS. 4, 5 and 9 is illustrated as adapted to be connected to a standard SAE speedometer (or tachometer) flexible shaft, whereby the tang of the flexible shaft (not shown) is of square section for insertion in a square hole 22 in the end of the shaft for establishing a driving connection.

The pressure generator as illustrated in FIGS. 4, 5 and 9 is adapted to be driven, for example, by a segment of a flexible shaft 23 (FIG. 17) connected to a speedometer drive 24 at a transmission 26 and to the shaft 19a in the pressure generator. A second segment of flexible shaft connects the shaft 19 in the pressure generator to drive a speedometer 28 of the automotive vehicle. The two segments of the flexible shaft are connected by any suitable couplings to the pressure generator. In the forms shown, the housing 16, 16a includes threaded extensions 30 to receive retaining couplings 31 (FIG. 17), the threads and retaining couplings preferably conforming to SAE standards whereby a single design of pressure generator will fit all automotive vehicles.

In FIG. 1 the housing 16 includes a reservoir 32 filled with any suitable liquid such as engine oil, silicone oil, ethylene glycol, etc., to a predetermined maximum level as determined by a filler opening 34. The liquid is fed by gravity to an inlet aperture or port 35 in the housing through a passage 35a in FIG. 1. In actual operation as shown by the shaded portion in FIGS. 4, 8 and 10, the port 35 and passage 35a are one and the same, being merely an opening or aperture in the housing wall between chambers 17a (FIG. 5) and reservoir chamber 32. The rotor 12 includes slots 36 or other suitable openings on the trailing side of the vanes (or at any desirable location) to intermittently uncover the port 35 as the rotor revolves in a counterclockwise direction as shown. Such uncovering of the port 35 permits liquid to enter the pressure chamber 17 where the liquid is moved in a circular path by the vanes and is urged outwardly against the cylindrical wall 92 of chamber 17 by centrifugal force to produce a liquid pressure at the wall varying substantially as a function of the square of the rotary speed of the rotor.

The shafts 19 and 19a may be sealed from leakage by any suitable means such as synthetic rubber lip seals (not shown). However when the generator is driven by a flexible shaft, it is highly desirable to have the torsional resistance of the vane, rotor, and shaft assembly as low as possible to prevent torsional whip of the shaft with possible fracture thereof. Also, as will be shown hereinafter, the speed-signal forces for operating the governor sensing mechanism are very light and sensitive so that small fluctuations due to torsional resistance might promote hunting of the governor. In order to prevent leakage past the shaft with negligible torsional resistance, the pressure generator unit disclosed herein may be adapted to use a novel arrangement of baffles. Referring to FIGS. 4, 5, 6 and 7, two baffles 37 having semi-circular projecting portions 37a are secured by suitable means, as by the drive screws shown in FIG. 4, to the inner walls of the pressure generator. The rotor 12, which is illustrated as being formed of molded plastic, includes in the molding (although it could be separate) two cup-shaped portions 12a (FIG. 5) which are arranged to cover the baffle projections 37a.

With the foregoing construction, the liquid is thrown outwardly by the vanes 14 when rotating so there is no tendency for leakage through the shaft at this time. Also, it can be seen that when the generator is inactive the liquid level in the reservoir 32 is below the shaft clearances and also below the cup-portions 12a so no leakage would occur when the generator is at rest. When the unit is started, any splashing of liquid (which would be negligible because of the thickness of the oil used) is blocked by the cup-portions. Then after the unit is operating with the pressure chamber 17 filled with liquid and the unit is then stopped, the liquid tends to flow around the chamber 17 to the bottom thereof and back to the reservoir 32 through the slots 36 (enough being provided for that purpose) and through the opening 35. Any oil or other liquid that leaks past the clearances of the rotor flows in one path down the side walls because of surface tension of the liquid where it meets the baffle projection 37a which directs the liquid *around the shaft* to the bottom of the generator without leakage. Another path of liquid, immediately after the generator is stopped, is along both sides of the rotor as viewed in FIG. 5; but surface tension will cause the liquid to "hug" the surface of the rotor until it reaches the cup-portions 12a which direct the liquid around the shaft to the bottom of the generator without leakage.

Sealed conduit means are provided to transmit the liquid pressure developed by the pressure generator to actuate the sensing member of the servo-unit, which will be discussed after first describing the servo-unit.

The servo-unit 11 as shown diagrammatically in FIG. 1, and in more constructional detail in FIGS. 2, 3 and 11-15, includes a housing 42 having a fluid circuit for the flow of fluid therethrough. Although any fluid may be used, the circuit illustrated in FIGS. 1 and 17 uses oil from the conventional engine oil pump 43 fed by conduit 44 from the usual engine oil sump 46 (FIG. 17). The pump sends the normal lubrication oil flow through the engine via a conduit 47 (FIG. 1), whereas the excess oil is by-passed around the pump through conduit 48 back to the sump or pump inlet. Such conventional automotive oil pumps include a relief valve 50 in the by-pass line (shown by block diagram) to prevent exceeding a maximum pressure.

Oil is supplied to the fluid circuit in the servo-unit by directing some of the by-pass oil through a conduit 51 preferably after the oil leaves an oil filter 52 (FIG. 17). The conduit 51 which directs pressure oil to the servo-unit includes a shut-off valve 54 for activating and inactivating the governor in a manner to be described.

The flow of working fluid in the circuit of the servo-unit 11 is through the valve 54, past a regulator valve 55 and its seat 56, through a passage or chamber 58, through an inlet orifice 59 controlled by a pilot valve 60 and through a chamber 62 and an outlet orifice 63 also controlled by the pilot valve 60, and into chamber 64 and to exhaust or drain through conduit 66 to a connection at 66a directing oil back to the sump 46 (FIG. 17).

Hence the term "fluid circuit" as used herein includes the valve 554, when used, all conduits and chambers communicating with the fluid path, and includes the regulator valve 55, 56 (operation to be described) and the pilot valve 60 and its orifices in the circuit.

A suitable pressure regulator is included in the servo-unit to maintain the fluid pressure entering the pilot valve at a predetermined value irrespective of the variations of pressure in conduit 51 from the oil pump or other source. The pressure regulator illustrated comprises, in the forms shown, a diaphragm 70 which encloses chamber 58 and is retained by a cover 71; the diaphragm, which may be made of metal or synthetic rubber material, or the like, is connected to the valve 55 to vary the aperture of the orifice 56. The regulator also includes a spring 72 acting to oppose the force of the diaphragm 70 produced by fluid pressure thereon in chamber 58 (the same pressure as exists at entrance to the pilot valve); the pressure on the other side of the diaphragm is atmospheric since chamber 74 formed by the cover 71 is exposed to the atmosphere by a vent 75 in the forms shown. The regulator valve is illustrated in FIG. 1 as a steel ball having a stem 76 pressed therein for connection with the diaphragm.

The operation of the pressure regulator in maintaining an accurately controlled pressure, such as 25 p.s.i. for example, at the entrance of the pilot valve is as follows. Assuming the governor is in operation and the oil pressure in conduit 51 decreases, for example, due to a decrease in engine speed or heating of oil, the pressure in chamber 58 also tries to decrease. But any decrease of pressure in chamber 58 causes the spring 72 to move the ball valve 55 downwardly (as shown in FIG. 1) to increase the aperture at the orifice 56 until the pressure in chamber 58 is restored. Any increase in pressure in conduit 51 will have the reverse action to maintain the predetermined pressure in chamber 58, or more important, at the entrance of the pilot valve.

Also, if the pilot valve 60 moves to decrease the flow therethrough (operation to be discussed), the pressure in chamber 58 would tend to increase. This action causes the diaphragm 70 to move the ball valve upwardly to reduce the aperture at the orifice 56 and restore the pressure at the entrance of the pilot valve to the controlled value. Conversely, when the pilot valve is moved to increase the flow therethrough, the pressure in chamber 58 tends to reduce and the regulator valve is opened sufficiently by the spring 72 to restore the controlled pressure. The entire pressure regulating action is so fast that for all practical purposes, a substantially constant or controlled pressure, depending on the initial force of the spring 72, is maintained at the pilot valve irrespective of pressure variations elsewhere in the circuit.

The pilot valve 60 is supported within the fluid controlled thereby for frictionless movements by means of parallel leaf springs 78 and 80. One end of each leaf spring is slotted at 78a (FIG. 11) for self-aligning adjustment when secured to the housing 42 by screws or other suitable means, and the other end of each leaf spring is secured to the pilot valve as by soldering or pressing (see FIG. 2). The manner of securing the leaf springs to the housing and to the pilot valve is shown best in FIG. 2, and is thoroughly disclosed in my Patent No. 2,737,165, issued March 6, 1956, so that a detailed discussion of this portion of the mechanism is unnecessary, although the frictionless leaf spring suspension is a very important part of the overall inventive combination in the instant case.

The present governor, as illustrated in FIG. 1, includes a power amplifier having a "fluid bleed" circuit controlled by the pilot valve 60 which is arranged to modulate pressures acting on the power member (diaphragm 128 or its equivalent) of the servo-motor or amplifier. In the illustrated type of pressure modulation system, which is an application of the fluid bleed principle of pressure control, at least two restrictions or orifices are required in series in the fluid circuit; and the pilot valve is actuated by speed-responsive means to vary the aperture of at least one of the orifices. In order to obtain a large range of pressure control for a given amount of pilot valve movement, the pilot valve in the forms shown operates simultaneously to vary the apertures of both of the orifices or restrictions.

In the forms shown, the pilot valve has two opposite conical faces each disposed to modulate the apertures oppositely of the orifices 59 and 63 as the pilot valve moves. When one face of the pilot valve seats on one of the orifices, the other orifice is at a maximum opening, and when the pilot valve is moved to the other extreme position which is determined when the second face of the pilot valve seats on the second orifice, then the first-mentioned face of the pilot valve is at a maximum opening. At any intermediate position of the pilot valve, the opening at one orifice gradually increases while the opposite orifice opening gradually decreases. In this manner, two oppositely variable restrictions are provided in the circuit whereby the pressure between the restrictions (in chamber 62) is varied by movement of the pilot valve from the value of pressure at the entrance to the pilot valve (regulated pressure) to the pressure at the outlet orifice or drain pressure, which in the forms shown is substantially atmospheric. Although in the forms shown, both of the restrictions are variable, the principle of fluid bleed pressure control may be applied (although with less pressure range), with only one of the two required restrictions being variable and the other restriction fixed.

The pilot valve is actuated by a diaphragm 81 of either metal or rubber-like material, although the latter is preferable. The diaphragm is sealed by a cover 82 which forms a chamber 83 and carries a nipple 84 (FIG. 2) for a rubber hose 86 (FIG. 1) to be connected to a similar hose nipple 87 in the pressure generator (see FIGS. 4 and 9). If a sealed metal tube is used for the connection of the two units in place of a rubber hose, then the hose nipple may be replaced by any suitable metal connecting fittings.

The coaction of the pressure generator unit and servounit may now be described since the pressure in chamber 83 is produced by the pressure generator which is sealably connected to chamber 83 by the conduit 86 and a pressure transmitter or converter 88 in the pressure generator as shown in FIGS. 1, 4 and 9. Referring to these figures, and particularly to FIG. 1, the pressure converter 88, in the forms shown, comprises a well or vessel of substantially enlarged cross-sectional area in relation to the cross-sectional area of the tube or conduit 86. The vessel or well 88 is connected to the cylindrical pressure chamber 17 through an aperture such as a passage or conduit 90, which in the constructional view of FIG. 4 is merely a rectangular slot in the molded housing at the cylindrical wall 92 as shown. The passage 90 is preferably located at least slightly above the highest possible level of the liquid in the reservoir 32, as shown in all forms, for reasons to be discussed.

When the pressure generator is at rest, the liquid level in the pressure chamber 17 is the same as in the reservoir chamber 32 whereby the lower segment of the pressure chamber is filled with liquid (as it seeks its level). The liquid level in this lower segment is desirably below the lowest part or opening of the shaft at 19a so the liquid cannot leak out at this condition of rest as discussed. Also, the level in the pressure chamber at rest, as previously mentioned, is arranged to be below the port or passage 90 to expose to the atmospheric pressure (then in chamber 17) the sealed space formed by the pressure converter 88, the chamber 83 and the connecting tube 86.

When the shaft 19, 19a is rotated, the vanes 14 revolve in the housing 16 and move the liquid from the lower segment in a circular path in the chamber 17 whereby centrifugal force of the liquid produces a pressure against the cylindrical wall 92, which pressure varies as substantially the square of the rotary speed. As the liquid is thus moved away from the lower segment of chamber 17, more liquid from the reservoir flows into chamber 17 through the slotted openings 36 when they pass by the opening 35 from the reservoir. In this manner, very soon after the generator is started, the chamber 17 is substantially filled with liquid so that the maximum possible pressure (at each speed) is produced on the wall 92. As the liquid is caused to circulate in chamber 17, it tends to flow through the port or conduit 90 into the pressure converter chamber 88. But as soon as the passage 90 is filled with liquid, air is trapped in the space formed by the chambers 88, 83, and the connecting conduit 86. The liquid pressure in conduit 90 is transmitted to the trapped air (regardless of the length of the tube 86) whereby the air pressure in chamber 83 acting on the diaphragm 81 is always the same as the liquid pressure adjacent the trapped air. This action produces an air pressure acting on the diaphragm 81 which varies smoothly and consistently as a function of the speed of rotation of the rotor 12.

The force on the pilot valve due to the air pressure acting on the diaphragm 81 is balanced by a leaf-type "speeder spring" 94 illustrated in FIGS. 1, 2, and shown in detail in FIG. 11, although any kind of spring may be used. One end of the speeder spring includes a formed V-shaped channel 95 which acts on and retains a knife-edge link 96 (shown best in FIGS. 11 and 15). The other end of the leaf speeder spring is secured to an arm or extension 98a of a speeder spring support 98 which is connected to a rotatable shaft 99 by means to be described. The right end of the speeder spring as viewed in FIG. 11 is interposed between the support extension 98a and a guide member 100 made of heavy metal, all being secured together by rivets or screws, etc., as shown in FIGS. 2 and 15, which are inserted through holes 102 as shown in FIG. 11.

The link 96 has a knife-edge or pointed upper end (shown) and a knife-edge lower end, as viewed in FIG. 11, to abut in the V-channel 95 at its upper end and a similar V-channel 103 at its lower end, the channel 103 being formed in a bracket 104 secured to an extension 106 of the pilot valve 60, wherein the extension is upset to secure the bracket to the pilot valve. FIG. 11a shows how the lower end of the knife-edge of the link 96 rests in the bottom of the V-channel 103 wherein sloping side walls prevent the link from sliding sideways out of position. The link may be retained in its desired position by the initial force (due to initial bending) of the speeder spring 94.

The upper leaf spring 78 for supporting the pilot valve is secured to the bracket 104 by any suitable means as by rivets shown in FIG. 11.

The speeder spring support 98 has an inverted U-shaped portion as shown in FIG. 11 adapted to slide into parallel slots 99a cut in the shaft 99 which is shown in section at the resulting slotted portion in FIG. 11. A bifurcated spring clip 107, which is shown in detail in FIGS. 16a and 16b, is adapted to be pushed into the slots 99a behind the support 98 as viewed in FIG. 11. The clip has two retaining fingers 108 formed therein and partially cut away from the body of the clip to permit the fingers to apply a downward spring force on the top of the support 98 when locking projections 110 formed at the ends of the arms of the clip (FIG. 16a) snap below the shaft 99 at the slotted section thereof. After the clip 107 is pressed into locking position, the force of the fingers 108 causes the stop 98b of the support to abut tightly against the top of the shaft. Also, as shown in FIG. 16b, the arms of the spring locking clip are slightly bowed or curved to exert a strong axial force on the support 98 and thus take up all axial play in the slots when the clip is pressed into locking position. This construction produces a simple and rigid connection of the support 98 with the shaft 99.

The speeder-spring shaft 99 is journalled in a boss 112 which is part of the housing 42 as shown in FIGS. 14 and 15. Any suitable fluid seal, such as a synthetic rubber lip seal 114 is inserted in a cylindrical bore of the boss, as shown in FIG. 15, to prevent fluid leakage past the shaft 99. A speeder spring lever 115, as shown in FIGS. 1, 14 and 15, is connected to the end of the shaft 99 by any suitable means as shown. The lever includes a pivotable connector 116 of the type used for carburetor controls (or other connection means) adapted to be secured to a Bowden wire 118 for example, as shown in FIGS. 1 and 17, to be controlled by a knob 119 on the instrument panel 120. The lever may be locked in any angular relation to the shaft and as installed in FIG. 17, would point downwardly, although it cannot be seen in FIG. 17.

When the knob 119 is pulled, as shown in FIGS. 1 and 17, the shaft revolves the support 98 which causes the speeder spring to bend and partially wrap around the guide member 100 whereby more force is exerted on the pilot valve, and the effective operating length of the speeder spring is progressively reduced. This reduction in operating length of the speeder spring as it partially wraps around the guide member provides a corresponding increase in spring rate, and the amount of increase in rate is predetermined by the contour of the guide member. As the shaft 99 is revolved and the spring 94 partially wraps around the guide member, there is a very slight movement of the free end of the leaf spring 94 in a direction transverse to the direction of the movement of the pilot valve. Also at fixed positions of the speeder spring shaft, the movement of the pilot valve causes the speeder spring to slightly wrap around the guide member, which in turn causes very slight movements of the free end of the speeder spring transverse to the pilot valve axis, which in practice has produced hysteresis of as much as 100 r.p.m. (without the knife-edge link).

Thus, the function of the knife-edge link 96 is to facilitate the above-described transverse movements of the free end of the leaf spring without friction of any kind, particularly with movements of the pilot valve and its cooperative elements. These elements together may be referred to as the "speed-sensing mechanism" since they all must respond cooperatively to minute changes in fluid pressure acting on the diaphragm 81 resulting from changes in the rotary speed of the generator. Thus, the "speed-sensing mechanism" comprises the diaphragm 81, the pilot valve 60 and its supporting leaf springs 78 and 80, the speeder spring 94, the link 96, and a second spring 122 may be connected at one end to the bracket 104 at the hole 104a (see FIG. 11) and to a fixed member at its other end in a manner and for purposes to be described. This spring opposes the force of the speeder spring so that more travel of the lever 115 is required to produce a given change in speed, and the lever is thereby made less sensitive.

When the speed-sensing mechanism moves in response to changes in the rotary speed of the generator, the movement of the pilot valve causes the pressure in chamber 62 to vary as a function of pilot valve movement, as explained, which pressure is transmitted through a passage 124 (see FIGS. 1 and 2) to a fluid servo-motor generally indicated by the numeral 126. The servo-motor may be of any suitable type utilizing a piston, diaphragm, or the like as a pressure responsive member; but in the forms shown, as in FIG. 2, the servo-motor includes a synthetic rubber diaphragm clamped between a stamped housing 129 (in FIG. 2) but is part of the main housing 42 in FIG. 1, and a stamped cover 130 to form a sealed pressure chamber 132 which is open only to the passage 124. The other side of the diaphragm is exposed to the atmosphere through an opening 133a in a stamped cup-shaped retainer 133 for a servo-spring 134, which spring biases the force produced by the diaphragm as a result of pressure in chamber 132. The retainer 133 in FIG. 2 is secured to the cover 130 by any suitable means as by spinning, silver soldering or the like, or it may be an integral part of the cover itself. The forces produced by the diaphragm act on a shaft 136 which actuates the engine-controlling-member, such as the throttle 137 of a carburetor 138 at certain times in a manner to be described. For the present consideration of the basic governing principle, the shaft 136 may be considered to be secured to the lever 139 connected to the butterfly-throttle shaft to effect an opening of the throttle as the pressure in chamber 132 increases and a reduction in throttle opening by the spring 134 as the pressure in chamber 132 decreases.

Thus, the servo-motor produces forces and travel for actuating the throttle which are functional with but greatly amplified from the forces and travel of the sensing diaphragm 81 due to the minute signal forces from the pressure generator. For this construction the sensing mechanism should desirably be completely frictionless in its speed responsive movements because the effects of any delays in the sensing mechanism due to dirt, gum, etc., are amplified by the servo-motor. It has been shown that the sensing mechanism of the instant invention is frictionless in its speed responsive movements, and the normal friction in the throttle shaft and its related or equivalent elements is overpowered and made small percentagewise in relation to the very large forces (and travel) produced by the servo-motor.

In the specification and claims herein, as well as in other patents of the applicant, the supporting leaf springs have been referred to as "substantially" frictionless. The leaf spring supports for the pilot valve actually are *completely* frictionless from a practical standpoint since in extensive tests of the pilot-valve-action by itself when supported by leaf springs, *no lag* or hysteresis could be measured. Any intermolecular friction in the material itself can, of course, be disregarded since it is immeasurably small. But the term "substantially" has been used solely in recognition of this minute intermolecular friction, although from a practical standpoint the leaf-spring-supported pilot valve is in fact completely frictionless.

Having described the constructional and operative relationship of the elements of the basic governor mechanism, the final operation and utility of the pressure converter or transmitter 88, briefly discussed above, can now be understood. The movements of the diaphragm and pilot valve, as explained above, are produced by the variation in pressure in the generator chamber 17 produced by the centrifugal force of the circulating liquid therein; hence the liquid pressure in chamber 17 which varies as a function of speed is transmitted as an equivalent air pressure to the sensing diaphragm in chamber 83 through the passage 86 and chamber or well 88. This pressure in chamber 83 is balanced by the difference between the speeder spring force and the force of the spring 122, if used. As the pressure in chamber 83 changes, the diaphragm and pilot valve move to another position until balanced by the new difference of forces of springs 94 and 122, etc. In practice the total movement of the pilot valve and hence the diaphragm 81 is usually in the order of .030 inch to .060 inch.

In order to produce the movements of the diaphragm 81 as above described, liquid must be displaced from the pressure generator to accommodate movements of the diaphragm 81 upwardly, as viewed in FIG. 1, and liquid must return to the generator when the diaphragm 81 is moved downwardly by the biasing spring force as the pressure in chamber 83 reduces. Such displacement of liquid due to movements of the diaphragm 81 must be without delay or the governor would tend to be unstable. Referring to FIG. 1 and also to FIG. 17, the generator unit might be installed at considerable distance from the servo-unit. As illustrated in FIG. 17, the generator unit might be mounted near the speedometer drive at the transmission at the underside of the vehicle whereas the servo-unit might be mounted on the engine block to permit the servo-motor conveniently to actuate the carburetor throttle.

If desired, the entire space from the generator to and including chamber 83 may be filled with liquid by providing a bleed (not shown) in the cover 82 such as a screw which can be sealed after filling the entire cavity. This has been done successfully in actual tests, but not only was the system difficult to fill, but the connecting conduit 87 had to be large enough to minimize lag in transmitting the speed signal although some lag still was present. These problems of filling and lag were overcome by deliberately trapping air in the conduit 86 between the pressure generator and the diaphragm chamber 83 and by raising the conduit or tube sufficiently above the outlet of the pressure generator to allow the liquid to rise in the tube sufficiently to accommodate the displacement of the diaphragm 81. According to this concept, it was a simple matter to fill the unit by merely adding liquid with the tube 86 disconnected and then connecting the tube thereby trapping air therein. It was then found that the lag was negligible regardless of the length of the tube.

However, with air trapped in only a tube between the generator and the sensing diaphragm, the liquid rose about six or seven inches high whereas (in the first generator units tested) the total pressure produced at the generator was about 25 inches of water. With this arrangement, the net pressure received by the sensing diaphragm was diminished by the "head" of liquid (which was silicone oil of about .95 specific gravity), so that the diaphragm actually received only about 19 inches of water pressure. In order to minimize this effect, the novel well or pressure-converter 88 is preferred for the concept of converting liquid pressure to air pressure. In this construction, the well 8 is of sufficiently large diameter that the liquid will rise only about ½ inch, for example, accompanying the displacement of the diaphragm 81, whereby the pressure transmitted to the diaphragm is diminished only slightly as a result of the liquid "head" accompanying diaphragm movement. Also, with the well-type pressure converter in which the pressure is transmitted from the well to the sensing diaphragm through the medium of air, the concept permits installation of the servo-unit either above or below the generator unit and at any remote distance therefrom without any change in the calibration.

The first well-type pressure converter unit actually tested had the passage 90, in FIG. 1, located below the level of liquid in the reservoir chamber. The unit was filled as described above, by disconnecting the tube 86 while filling the generator, and then connecting the tube after filling, thereby permanently trapping air between the well 88 and diaphragm 81. With this arrangement there would be an initial level at the bottom or lower portion of the well, and when the pressure increases with speed to cause full travel of the diaphragm 81 the level would rise, for example, to the dotted line 88a. Although this form of the concept could be used successfully, it includes several undesirable characteristics. Since the air is permanently trapped in the spaced between the well and diaphragm, any minute leakage after six months or one year of use, such as through the pores of the diaphragm, would cause the level in the well to gradually rise. Also if the unit is installed in a hot climate, and the vehicle is later driven in colder climates, the contraction of the air would permit the level to rise, although the error would not be great. In addition, another minor error would be produced if the unit were to be filled at sea level and driven to higher altitudes in which instance the expansion of the trapped air would cause the level to reduce. However the only effect of a change of air density would be on the fluid level since the effective pressure for actuation of the sensing diaphragm 81 is produced by the liquid which is substantially independent of air density or altitude changes.

All of the foregoing minor problems are eliminated by the forms shown in FIGS. 1 and 4 in applying the inventive concept. In this preferred arrangements as explained previously, the passage 90 is located *above* the highest level in the reservoir chamber 32. Then, whenever the vehicle stops, all the liquid flows out of the pressure converter chamber 88 and passage 90 into the bottom of the pressure chamber 17 to seek the same level as in the reservoir; then the entire space of the chambers 83, 88 and conduit 86 is exposed to the *existing* atmosphere through the air space above the liquid level in the reservoir via opening or port 35 and the filler opening 34 as well as through the slight air space around the shaft 19, 19a. Thus with this arrangement the pressure of the air in chambers 83, 88, and conduit 86 is equalized to the atmosphere regardless of altitude or temperature effects every time the vehicle stops even for a short time. If the generator is operated by the engine, then the fresh or equalized "charge" of air for chambers 83, 88, and conduit 86 occurs each time the engine is stopped. With either road-speed or engine-speed drives, when the generator vanes are revolved, the liquid in chamber 17 is moved in a circular path as explained. Then centrifugal force thus produced causes liquid to try to flow through the port or passage 90, but as soon as this port is covered by the liquid, the new charge of pressure-equalized air is trapped between the liquid and the sensing diaphragm 81; then the liquid only flows into the pressure converter well 88 to displace the diaphragm 81, as explained, whereby the liquid level might rise to the dotted line 88a in FIG. 1. This form of the invention is desirable, also, because the generator can be filled to the desired initial level without disconnecting the tube 86, since air is not trapped above the liquid until the generator is operating.

Having explained the coaction of the pressure generator unit and the servo-unit, the overall operation of the device as a governor may be discussed. Referring to FIG. 1, the knob 140 is pulled out which opens valve 54 by means of a Bowden wire 142, or the like, and permits pressure oil to flow through the fluid circuit as explained, and the pressure of the working fluid at the entrance to the pilot valve is maintained constant by the pressure regulator elements 55, 76, 70, 72. Then with the knob 119 pulled out to revolve the lever 115 and to apply a force downwardly on the pilot valve by the speeder spring 94, the pilot valve is moved downwardly to permit fluid pressure to act on the diaphragm 128 and open the throttle 137 against the force of the spring 134. Thereafter the speed increases until the pressure produced by the generator acting on the sensing diaphragm produces a diaphragm force sufficient to balance the force of spring 94 minus the force of spring 122. At this balanced condition of the sensing mechanism, a definite pressure is applied to the servo-motor diaphragm 128 because of the modulating effects of the oppositely variable orifices or valves at 59 and 63. The diaphragm 128 and throttle 137 then find a stable position since the force produced by the fluid pressure on the diaphragm 128 is balanced by the force of the spring 134 which increases as the diaphragm moves to the right as viewed in FIG. 1.

With the governor in stable operation as above described, if the vehicle ascends a hill and the speed tends to reduce, the pressure in chamber 83 on diaphragm 81 will reduce, so that the pilot valve is moved downwardly slightly to a new balanced position by the speeder spring 94. This action causes more pressure to be applied to the diaphragm 128 to effect its movement to a new stable position to the right in balancing the spring 134, whereby the throttle 137 is opened slightly. This speed-restoring procedure continues until the speed of the engine is returned to substantially its original governed value. When the vehicle decends a hill the speed tends to increase, and the governed speed is restored in a reverse manner from the foregoing action.

The governor illustrated in FIGS. 1–17 is shown adapted as an automatic throttle for automobiles and trucks, as previously explained. For this application of the governor mechanism an override mechanism is provided in which the shaft 136 carries an override member 145 having a slot 146 disposed to receive a pin 148 carried by the lever 139. The conventional accelerator 150 is connected by a link 152 to the lever 139 by the usual linkage mechanism such as lever 153 and shaft 154. A conventional accelerator spring 156 biases the linkage mechanism to move the throttle 137 and accelerator toward idle position. The accelerator linkage above described is all an existing part of present automotive vehicles, and the override mechanism from the governor might conveniently be installed at any portion of this linkage as well as at the lever 139 as illustrated.

Now consider the action of the override mechanism as an automatic throttle. When the knob 140 is pushed in and valve 54 is shut, the servo-spring 134 forces the diaphragm 128 and override member 145 to the extreme left position as viewed in FIG. 1 wherein a stop 158 abuts the right end of projections of the cover 130, or other suitable stop means which may be provided. In this position with the accelerator and throttle at idle conditions, the left end of the slot 146 is adjacent to but not quite touching the pin 148. The governor is then completely inactive since no pressure is available to the servo diaphragm 128, and the accelerator can actuate the throttle in a normal manner since the pin 148 can slide rightwardly unrestricted as the throttle is moved all the way to its wide-open-position if desired.

When the knob 140 is pulled outwardly in order to open valve 54 for directing pressure-fluid through the fluid circuit and the knob 119 has been set to adjust the speeder spring to select a desired governed speed, fluid pressure is directed to the diaphragm 128 which then balances the springs 134 and 156 as described above to position the throttle as well as the accelerator and its linkage. The operator's foot can then be removed from the accelerator since the spring 156 acting on the accelerator linkage mechanism causes the throttle and its lever 139 to urge the pin 148 in abutting contact with the member 145 at the left end of the slot. At this condition, the accelerator and its linkage mechanism as well as the throttle and lever 139 are operated automatically as though they were a part of the diaphragm 128 and shaft 136, whereby the spring 156 is in effect added to the spring 134 as the governor operates as above described to maintain automatically the desired speed. If the spring 156 is strong enough to overcome the friction in the system, the spring 134 may be omitted. The governor is then operating the accelerator as an automatic throttle and the operator can be free of the strain of holding his foot on the accelerator during sustained driving, as on turnpikes.

If it is desired to pass another vehicle, the operator merely depresses the accelerator to open the throttle to whatever extent is desired whereby the lever 139 moves the pin 148 to the right in the slot 146 while the increased speed causes the increased pressure on diaphragm 81 to move the pilot valve 60 upwardly as viewed in FIG. 1, thereby reducing the pressure to the diaphragm 128 to let the spring 134 move the stop 158 to its maximum travel leftwardly. After passing the other vehicle the foot can again be removed from the accelerator which will move toward idle position until the pin 148 again abuts the member 145 at the left end of the slot until the speed returns to the governed value; at this time, the pressure on diaphragm 81 reduces to permit the pilot valve to move downwardly enough to apply sufficient pressure to the servo-diaphragm 128 to open the throttle for restoring the governed speed.

Thus it has been shown that the governor of the present invention may be arranged to function satisfactorily by merely connecting it to the existing carburetor throttle linkage or similar fuel-controlling means without adding bearings or revising the carburetor or other elements. Also as can be seen in FIG. 17, the servo-unit 11 may be installed remotely from the carburetor by merely using a long shaft 136 or connecting the override mechanism to any part of the conventional carburetor linkage other than at the carburetor. Also, if necessary for hood clearances, the servo-motor 126 may be mounted separately from the control unit which case the passage 124 would be made as a separate tube. The servo-motor would be connected to the linkage as discussed above and the control unit would be mounted in any convenient space under the hood of the automotive vehicle.

The elimination of bearings and other special revisions of the carburetor is facilitated by providing ample pressure (and/or area) for the servo-diaphragm (or piston) 128. This is accomplished in the present invention by using any of the fluid pressures available normally as a part of the vehicle without the added cost or complexity of a special pump and drive therefor. But the use of existing fluid pressures such as engine oil, water pressure, or engine vacuum is made feasible by including in the inventive combination a pressure regulator to remove the normal pressure variations of the source fluid and to supply a controlled pressure to the pilot valve. This is particularly true when the servo-motor is small and the regulated pressures are relatively high such as 30–70 p.s.i. For example, if non-regulated oil pressure were directed to the pilot valve, the normal variations of the oil pressure would provide disturbing forces due to the pressure on the pilot valve area and indirectly on the servo diaphragm, which disturbing forces would be large percentagewise in view of the very low signal forces produced at the diaphragm 81. However, if a supply of fluid is available for the servo-motor circuit in which the supply pressure is already sufficiently constant that governor operation is not disturbed, then the regulator may be omitted, providing the tube carrying the fluid from the source to the governor is large enough to have negligible line loss.

The foregoing becomes significant considering that the main elements of the generator unit design, which has already been operated in governor control, utilizes a rotor only about 2½ inches in diameter. This unit, using an oil of about 0.9 specific gravity, has produced pressures as high as 35 inches of water at 200 r.p.m. of the rotor 12. With this size generator the servo-diaphragm exposed diameter was about two inches and the regulated pressure at the pilot valve was about 25 p.s.i.

The above facts based on actual tests help to understand the present invention. In order to maintain the size of the generator small enough to be within acceptable limits and small enough to be driven by a flexible shaft from the speedometer drive) a very low but consistent pressure is produced as a function of rotary speed. The true sensing pressure, or amount of change in pressure for an incremental change in speed, is at times very low, such as 0.5 to 0.8 inch of water per 100 r.p.m. change in speed. Thus, with this low sensing pressure to achieve stable and consistent governor operation with good regulation and reliability, the frictionless "sensing mechanism" as described above becomes an important part of the inventive combination to amplify the small signal forces without friction or other lag. Stated another way, the frictionless sensing mechanism "opens the door" to the practical use of the pressure generator of small size with its inherently low sensing pressures as disclosed herein as part of a speed governor, although the generator is believed to have novel and invention features in itself. Then, as described above, a high fluid pressure from a normal source in the vehicle is provided for the servo-motor, and the normal fluid pressure variations that would act on the pilot valve to upset the low speed-sensing forces thereon are removed by the pressure regulator.

The servo-motor can be of any size, but must be made larger as the regulated pressure is reduced to provide sufficient force to overpower without governor hysteresis the friction in the carburetor throttle and its linkage including the accelerator. However, with a larger servo-motor size and a lower pressure, more fluid must be displaced by the servo-motor which may tend to limit its speed of response. Tests to date indicate that for automatic throttle operation, the throttle must be moved through its entire travel at least as fast as ½ second. Truck and farm tractor governors now appear to require a still faster throttle movement. Thus it is desirable to use a higher pressure and a smaller servo-motor if possible, which is made feasible by the pressure regulator, as explained.

The override control system disclosed herein has been shown only in its basic elements. A more complete disclosure of a novel control system for an automatic throttle is the subject of another copending patent application, Serial No. 712,847, filed February 3, 1958, entitled "Control Apparatus for Automatic Throttles," and all claims to the control system for an automatic throttle are made herein.

As used in the specification and claims herein, the term "servo-unit" (11) comprises the control or brain unit and servo-motor 126. As used herein, the term "servo-mechanism" comprises the servo-motor 126 and the pilot valve and its orifices and the associated circuit including regulated pressure fluid therein, as well as the sensing diaphragm and its biasing springs. The term "servo-mechanism" comprises the "sensing mechanism" (as previously defined) and the servo-motor. The term "rotary speed" is used generally to cover both engine speed or road speed, unless separately specified.

In FIGS. 1 to 17 there are illustrated several sub-combinations which, it is believed, are novel, per se. One feature that may be incorporated in the governor if desired, is a safety shut-off as shown in FIGS. 1, 2, and 11. The support 98 includes a finger 98c which abuts against an extension 104b of the bracket 104 which is made of heavy spring material. The support includes a stop portion 98d to limit the travel of the speeder spring and its lever at the low speed end of its travel. The finger 98c is arranged to contact the extension 104b sufficiently before the stop portion 98d contacts the casting (hidden by the screw in FIG. 2 but shown diagrammatically in FIG. 1) that further movement of the speeder spring lever 115 to the limit of its travel when the stop portion strikes the casting physically carries the pilot valve upwardly to close orifice 59 and shut off all pressure to the servo-motor, thus inactivating the governor. The purpose of having the bracket 104 made of spring material is to permit the finger 98c to continue to move a very short distance after the pilot valve seats until the stop portion 98d strikes the housing. This is done since it would be impossible in production to have the pilot valve contact its seat and have the stop strike the housing at exactly the same time, and it is not desirable to use the small pilot valve as a stop since an excessive force could be applied by the lever 115. In this manner, by merely pushing in the knob 119, the pilot valve physically shuts off the pressure to the servo-motor and the throttle 137 closes regardless of anything else that might happen in the generator or servo-unit.

It has been explained that in the forms shown, two springs 94 and 122 act on the pilot valve to comprise the speeder spring system. If desired, a single spring may be employed, but in order to have sufficient force to balance the force of the sensing diaphragm 81 throughout the range of governed speeds, the required travel of the speeder spring lever might be very short. Thus an optional feature of the present invention is to provide two springs biasing the pilot valve, in which a main speeder spring 94 opposes the sensing forces of diaphragm 81, and a second spring 122 has one end fixed to a stationary part and the other end acting on the pilot valve to oppose the force of the speeder spring. Hence the speeder spring lever 115 must travel farther to produce the same increase in (net) spring force on the pilot valve for a given speed change as would be produced by a single spring. In this manner, the speeder spring control is made less sensitive.

In the forms of the invention shown herein, the supporting leaf springs 78 and 80 have very low spring rates, since their thickness may be from .005 to .009 inch, for example. However, if desired, these springs may be made thicker to produce a higher rate which would be a measurable percentage of the total speeder spring system. In fact, if these supporting leaf springs are made heavy enough and are pre-bent to exert a force on the pilot valve in an upwardly direction, they can either supplement the spring 122 or perform its function completely whereby spring 122 may be deleted. With such a construction the leaf springs 78 and 80 would perform the double function of supporting the pilot valve for frictionless movements and would comprise the second spring means of the speeder spring system to reduce the sensitivity of the speeder spring lever, as discussed above.

The leaf spring system also includes the guide member 100 to control the bending of the leaf speeder-spring 94. This novel invention may be included in the inventive combination to compensate for the non-linearity of the sensing pressure developed by the pressure generator. For example, this pressure may vary substantially as a function of the square of the speed of the rotor of the generator. If a uniform-rate speeder spring is used to bias the force of the sensing diaphragm 81, there would be a much greater *change* in diaphragm sensing force at higher speeds than at lower speeds which would produce less speed-droop at higher speeds. In order to provide more uniform speed-droop throughout the speed range, the guide member 100 increases the rate of the speeder spring 94 as the lever 115 is moved to higher speed positions by reducing the effective or working length of the speeder spring in a predetermined manner. Thus, at higher speeds, the rate of the speeder spring is increased sufficiently that for a given *change* in speed, the pilot valve is moved substantially the same amount at all governed speeds.

The leaf spring system may be made completely (or partially) of bi-metal to compensate for any effects of temperature on the fluid in the governor. This construction is shown in FIG. 11, in which the speeder spring 94 and/or one or both of the supporting leaf springs, such as spring 78 as shown, are illustrated made of bi-metal. The springs would all be arranged to bend in the same direction as necessary to compensate for any undesirable temperature effects by adding a temperature sensitive force on the pilot valve 60. If temperature compensation is unnecessary, the leaf springs are made of thin sheet stainless steel, Phosphor bronze, beryllium copper, or the like.

Although in the preceding discussion, FIGS. 1 and 2 have been considered functionally the same, there are disclosed in FIGS. 2, 3 and 3a several optional novel features not shown diagrammatically in FIG. 1. Referring to FIGS. 3 and 3a, the spring 122 is secured at its fixed end to a downturned tab 170a of a plate 170 which slides into the casting of the housing 42 in slots provided therefor. The plate 170 is retained by the cover 172 and includes a support 173 bent perpendicularly. The support 173 has secured thereto by suitable means, as by rivets, a leaf spring 174 at one end thereof. The other end of the leaf spring is freely movable in a direction transverse to its plane and the regulator shaft 76 is either secured to or in abutting contact with the leaf spring for supporting the shaft in frictionless movements. The abutting connection is illustrated and is accomplished by having the shaft 76 stepped as shown whereby the leaf spring abutment occurs at one of the steps. One end of the shaft 76 is secured to the diaphragm 70, as by spinning, and the other end of the shaft abuts or "rams" the regulator ball valve 55 which is separate from the shaft. The ball valve is urged toward its seat by a light retainer spring 176, and is urged away from its seat when so moved by the shaft 76 as the diaphragm 70 acts to establish the regulated pressure. The ball valve does not tend to contact the seat in its regulating movements because the flow of fluid past the ball tends to keep it centered. With such a construction the movements of all of the regulator parts are frictionless in operation.

The plate 170 has a section cut away to form an aperture 178 as shown in FIG. 3a in order to pass the working fluid through the circuit. The plate, in the form shown in FIGS. 2, 3 and 3a, divides the chamber 58 into two chambers in which the regulator senses the pressure in chamber 58a at the left of the plate as shown. In most installations, the aperture 178 is made large enough to pass the working fluid without restriction whereby the pressure is identical in both chambers and the regulator controls the pressure at the entrance to the pilot valve. If a highly viscous liquid is used as the working fluid in the servo-motor circuit, a very large exhaust tube 66 must be used (see FIGS. 12–14) in order to eliminate "back pressure" on the sensing diaphragm 81 which would upset the functionality of the signal pressure.

In some installations, such as when a viscous oil is used as the working fluid, the size of the exhaust tube may be limited which would produce a slight back pressure in chamber 64 acting on the sensing diaphragm. This back pressure is a function of the rate of flow through the circuit which is a maximum at the mid-position of the pilot valve and gradually diminishes to zero as either of the two valve faces thereof moves to their seated positions. If desired, this back pressure on the sensing diaphragm can be compensated by reducing the size of the aperture 178 to restrict the flow between chambers 58a and 58. Then the regulator maintains a constant pressure in chamber 58a, whereas the pressure in chamber 58 will gradually reduce as the pilot valve approaches its mid-position. Normally a constant unbalance force is produced by the constant pressure acting on the exposed area of the pilot valve; but when the fluid pressure gradually reduces as the valve moves toward its mid-position from either direction, the fluid unbalance force on the exposed area of the pilot valve can be made low enough at the valve mid-position to compensate for the slight back pressure on the diaphragm 81 which tends to move the valve downwardly. In other words the fluid unbalance force, which normally urges the pilot valve downwardly with a constant force, has less-than-normal force gradually to the mid-position of the pilot valve; this condition has the same effect in the overall balance of forces on the pilot valve as to urge it upwardly at the mid-position, thereby compensating for the downward force produced by the back pressure.

FIG. 10 illustrates a modified form of rotor and vane assembly which may be used in the pressure generator tending to eliminate end clearances of the vanes particularly in production units. The rotor 180 is not close fitting as in the form of FIGS. 4 and 5, but comprise a thin revolving plate as shown in FIG. 10 and the sectional perspective view in FIG. 10a. The plate has a pair of diametrically opposite slots 181 adapted to receive rectangular vanes 182 which are slidable outwardly in the slots under the influence of centrifugal force and also by springs 184 if desired. The vanes are made wide enough to be self-guiding and hence can be "pushed" around the generator housing by the rotor in sliding movements between the walls of housings 16 and 16a as shown in FIG. 10a. The liquid is urged outwardly by centrifugal force to form a torus-shaped chamber as though it were a sealed or formed chamber as in FIGS. 4 and 5. The vanes may have slight undercuts 182a on their sliding faces in order to reduce the surface tension in their sliding travel around the walls of the generator. If the vanes are made heavy enough, such as of brass or steel, the centrifugal force thereon may be sufficient to urge them against the outer wall 92 and the springs 184 may be omitted.

In any of the forms of pressure generator illustrated herein, more vanes may be employed such as three or four, etc. Additional equally-spaced vanes tend to reduce slippage of liquid past the vanes up to a certain point.

In order to eliminate the production variations of side clearance of the vanes, the form of vane shown in FIG. 10b which is a modification of FIGS. 10 and 10a, may be employed. In this form of vane which slides outwardly in the slots 181 of the rotor 180 (not shown in FIG. 10b), the vanes comprise a channel 186 adapted to receive and guide a slat 188. The channel and slat are urged apart against the walls of the housings 16a and 16, respectively, by spring means such as by the wave spring 190 shown in detail in FIG. 10c. The wave spring has an inturned end 190a to prevent the spring from scraping the outer wall 92. If the vane parts are heavy enough, the spring 184 can be deleted as shown in FIG. 10b.

If it is desired to reduce the size of the pressure generator, mercury may be used as the liquid therein. Since mercury is about 14 times as heavy as oil it would produce correspondingly higher pressures in the generator unit. Mercury has a very low viscosity so it would be very fast-acting or sensitive in governor operation.

Although all forms of the invention shown herein are based on the centrifugal-liquid sensing unit (pressure generator), any of the novel sub-combination inventions could function equally well with any kind of speed sensing means other than centrifugal liquid sensing.

FIG. 13 shows a novel method for coupling the large exhaust tube to the housing 42. Since as explained above, this exhaust tube may be large (½" to ⅝" tubing) when oil is used as the working fluid, the size and cost of standard threaded automotive fittings would be excessive, if not prohibitive. The novel coupling shown in FIGS. 12, 13 and 14 comprises a bead or flange 192 on the tube at a predetermined distance from its end. In the form shown, this flange is made by upsetting the tube. The housing 42 includes formed bores 42a therein to receive the projecting end 66a of the tube. A seal 194, which may conveniently be made by cutting off short lengths of synthetic rubber tubing, is slipped in the bore 42b which is tapered slightly at its outer (left) end to permit the seal to be inserted. The seal is made of slightly larger outer diameter than the bore 42b. Seal may first be slipped over the projection 66a, the seal being slightly smaller than the outside diameter of the tube, and then the tube and seal are inserted in the bores 42a and 42b. The tube is retained by a spring clip 196 which encircles the tube 66 on the left side of the flange 192. The clip has spring fingers 196a which include rectangular slots or openings therein adapted to engage two corresponding projections 198 of the housing. The projections 198 are sloped on one side and square on the right side so that the clip can be forced rightwardly whereby the fingers expand until the slots coincide with the projections and the fingers then snap into a latching position shown in FIG. 14. The coupling cannot come apart until the two fingers are spread apart sufficiently to remove the clip and tube. This coupling can be made in production at very low cost and small size and will not leak since the tube only handles fluid. Also, the connection may be made tamper-proof by running a governor seal wire through holes 198a in the projections 198.

FIG. 18 illustrates how the governor of the present invention may be adapted for use in trucks and farm tractors. The governor mechanism and its operation, except for a minor change to be discussed, is as shown and described with reference to FIG. 1, and is illustrated using engine oil as a power fluid and is so indicated by the same numerals in FIG. 18 as in FIG. 1, and hence needs no further discussion in this respect. The main difference in the installation shown in FIG. 18 from the automatic throttle application illustrated in FIGS. 1 and 17 is in the control of the governor. In FIG. 18, the accelerator 150 actuates the link 154 and a lever 200 pivoted at a hinge or fulcrum 201 to effect movement of a link 202 which is connected directly to the speeder spring lever 115. The entire connected assembly of the lever 115, link 202, lever 200, link 154 and the accelerator is biased by a spring 204 in a low speed or idle direction. The servomotor 126 has its diaphragm shaft connected to the throttle without play (without the override mechanism of FIG. 1), whereby movements of the throttle are entirely controlled solely by the governor mechanism from the servo-motor thereof. Thus in the installation shown in FIG. 18 the accelerator controls only the speeder spring of the governor mechanism, and the governor mechanism, in turn, controls the throttle or equivalent engine-controlling-means. Then for each position of the accelerator, there is a definite governed speed at all loads, which governed speed increases as the accelerator is depressed. If the shut-off valve 54 is used, then the knob 140 must be pulled before the engine can be operated.

One difference from the automatic throttle form shown in FIG. 1, is that for trucks and farm tractors the governor usually responds to and controls engine speed. Since farm tractors are all equipped with tachometers driven by a flexible shaft from the engine, the standard design of the pressure generator may be connected in this driving means exactly as shown and described for the speedometer drive in FIG. 17. Also, many trucks are either standard or optionally equipped with flexible shaft tachometer drives so the pressure generator unit can be installed as described above. In all such flexible shaft tachometer drives, the flexible shaft would be divided into two parts or segments; one segment would connect the engine tachometer drive to the pressure generator, and the second segment would connect the pressure generator to the tachometer. Any other available engine speed drive, of course, may be used to rotate the pressure generator. Or if desired, a special drive may be provided in the engine, but of course the use of the readily available tachometer flexible shaft is the most desirable since no special governor drive is necessary.

The governor mechanism installed as above described may be used on farm tractors except that the accelerator 150 and its linkage would be replaced with any suitable hand control, for example, such as a Bowden wire (not shown) connected to the lever 115. The farmer then sets the hand control to establish any desired position of the lever 115 which produces a desired operating speed; the governor mechanism then automatically runs the tractor at that selected speed, and the farmer is free to supervise the work done by the implements drawn by the tractor. In order to operate at a higher speed, the farmer merely changes the setting of the hand control. There would be no limit to the maximum selectable speed as in truck installations, and hence the governor mechanism would not be of the speed-limiting type. The servo-mechanism of the governor applied to farm tractors would use either oil from the engine or from the hydraulic pump that operates the farm implements, or engine vacuum, although oil is preferable.

Governors are installed on trucks (and even on passenger cars) by owners of fleets in order to prevent their drivers from exceeding a maximum set engine speed (and sometimes road speed). Hence the speed-limiting installations as shown in FIG. 18 may be used for truck or passenger car fleets, wherein the accelerator operates the speeder spring of the governor, and the governor alone operates the throttle. Means are provided to limit the travel of the assembly of the lever 115, its shaft 99 (FIG. 11), the support 98, and the speeder spring 94. For example, a screw 205 may be inserted through the housing 42 to abut the support 98 to limit its travel on the high-speed side. The screw may thus be adjusted to determine any desired maximum governed speed, and is locked in position by a nut 205a. The screw and nut must be rendered tamper-proof by any of the usual methods now practiced, such as providing holes in the screw head and wires therethrough connected and sealed to a fixed part of the vehicle; or a cover protecting the screw and similarly sealed to prevent removal thereof may be provided. As discussed above the speed-limiting adjustment, such as the screw 205, would not be used in farm tractor installations.

Thus it has been shown how the novel construction of the same basic governor mechanism disclosed herein can be adapted for many applications such as non-speed-limiting automatic throttles for passenger cars (not trucks), or a speed-limiting governor for truck fleets or fleets of passenger cars such as taxicabs, or a non-speed limiting governor for farm tractors, as well as other general governor applications. For example, the governor mechanism disclosed herein may be adapted to operate the control member of a fuel injection system for either diesel or gasoline engines. If gas turbines are used in automotive vehicles, the governor can be adapted to operate the standard control member therefor in controlling the speed of the turbine or the speed of the vehicle powered by the turbine. In any of these installations of the governor mechanism disclosed herein, the normal fuel-control-means and linkage therefor may be used with little or no revision to be operated by the governor because of the large operating forces possible from the servo-motor for reasons previously discussed. Thus, because of the inherent simplicity of the governor mechanism itself and because of its substantially universal adaptability which lends itself to higher automation in production, the complexity and cost to the public of a governor installation according to the present invention would tend to be relatively low.

It has been shown how the governor mechanism of the present invention can use any kind of working fluid in the servo-mechanism such as engine oil, power steering fluid, diesel fuel pressure, air pressure from the air brake pump or air suspension pump, water pressure from the cooling system or, in farm tractors, the hydraulic implement-operating pressure, or any available fluid pressure. In the forms of the invention shown thus far, only positive pressure fluids have been considered in the servo-mechanism circuit.

FIG. 19 illustrates how engine vacuum can be used to cause air to flow through the fluid circuit of the governor with only minor modifications from the basic governor mechanism above described. Referring to FIG. 19, the pressure generator unit 10 and the sensing diaphragm 81 are constructionally and operatively the same as previously described and hence the elements thereof are indicated by the same numerals; also most of the elements of the control unit 11a and the servo-motor 126a as well as the accelerator linkage and override mechanism are the same as the control unit 11 and servo-motor 126, respectively, in FIG. 1, so that the construction and operation of the pressure generator and the identical portions of the servo-mechanism need not be repeated here.

In the working fluid circuit of the governor, air at substantially atmospheric pressure is caused to flow into the governor at a port or conduit 206 into chamber 64, past the pilot valve orifices controlled by the pilot valve 60 and from chamber 62 into chamber 58, past the regulator valve 55, 56 and out conduit 208 to the intake manifold 209 which is subjected to engine vacuum that induces the air flow through the circuit. The regulator spring 72a is illustrated as of the extension type so that when the vacuum in chamber 58 tends to increase above the regulated value, the diaphragm 70 reduces the opening of the regulator valving 55, 56 to restore the regulated value of the vacuum, and conversely. In this manner a substantially constant value of vacuum such as five inches of mercury, for example, is maintained in chamber 58 and at the pilot valve (outlet), whereas the pressure in chamber 64 is substantially atmospheric.

The shut-off valve of the unit controlled by the Bowden wire 142 may comprise a shaft 210 slidable in a bushing 211 and connected to the fixed end of the spring 72a to position same. When the shaft 210 is moved sufficiently to the right, as shown in FIG. 19, the force of the spring 72a is reduced enough to cause the vacuum in chamber 58 to reduce below operating values so that the governor becomes inoperative. When the shaft 210 is moved is to left until a cylindrical cup 212 which is secured to the shaft abuts the right end of the bushing, the regulated vacuum is established and the governor will function. The value of regulated vacuum may be made selectable by having the bushing 211 threaded into a tubular extension 214 and providing means, such as tool holes 215 for an adjusting tool therefor. The cup 212 is disposed so that a complete rightward movement of the shaft 210 causes the right end of the cup to strike the disc 216 and physically force the ball valve 55 to close on its seat 56, and thereby produce a safety shut-off.

Disregarding for the moment the cam resetting mechanism, to be described, the operation of the governor as an automatic throttle using vacuum as a power source is as follows: With the shaft 210 moved to the right, the governor is inoperative and the servo spring 134 forces the slotted link 145 to the left until the stop 158 abuts the projections on the carburetor body as shown. Then the accelerator may be operated in a normal manner as the pin 148 can slide freely in the slot 146. When the shaft 210 is moved to the left against the stop bushing 211, and the wire 118 sets the lever 115 for a desired governed speed, vacuum is transmitted to chamber 132a and the servo-diaphragm 128 moves to the right until balanced by the spring 134, which carries the accelerator link 215 and accelerator 150 along with the throttle 137 in establishing a governed speed. If the vehicle ascends a hill, the engine slows down and the generator pressure in chamber 83 reduces so that the pilot valve is moved leftwardly (as viewed in FIG. 19) by the speeder spring 94 which increases the vacuum to the servo-motor chamber 132a and opens the throttle until substantially the governed speed is retored. If the vehicle descends a hill, the governor maintains the set speed in a reverse manner. At any time during governor operation, the set speed may be exceeded for passing other vehicles by merely depressing the accelerator since the pin 148 (carried by lever 139) is free to slide in the slot 146 in a throttle-opening direction.

The governor may be calibrated, if desired, by using a higher-rate speeder spring 94 to improve stability and then using a cam 218 carried by the throttle shaft and acting on a spring 220 to reset the pilot valve within acceptable regulation. A cam follower pin 222 which slides in a bushing as shown transmits movements of the cam to the reset spring 220, and a bracket 223 transmits the force of the reset spring to the pilot valve (and is secured thereto). The reset mechanism operates as follows: Assume the governor is set for fairly broad regulation (without the reset mechanism) because of a higher rate speeder spring. Then as the throttle opens in the governing action, the speed reduces because of the inherent droop. But with the reset mechanism, as the throttle opens in the governing action, the cam produces an increased supplemental force on the pilot valve through the spring 220, which tends to displace the pilot valve slightly to the left and increases the vacuum in chamber 132a to effect a slight additional opening of the throttle to compensate for the natural speed droop, so that the net regulation is very close. The spring 224 insures that the pin 222 always follows the cam regardless of the friction in the bushing.

It makes no difference in principle whether the cam 218 is operated directly at the throttle, or whether by a separate shaft connected to the throttle as shown in my copending patent application Serial No. 543,831, filed October 31, 1955. A fixed link may be substituted for the cam, since the cam is merely a variable link, and there is no difference in principle whether the link is operated by the throttle or the servo-motor diaphragm 128 or its shaft means.

Although in FIG. 19, a series type pressure regulator is illustrated, any suitable pressure regulator may be employed for controlling vacuum in the circuit, such as a by-pass ball regulator as disclosed in said copending patent application, Serial No. 543,831. However the series diaphragm-type regulator has the advantage of better regulation and also controls the fluid in the main governor circuit without additional flow, which is important when using existing sources of pressure fluid in the power circuit. In the series-type regulator it is desirable to have the regulator ball 55 leak-proof when shut, and deliberately to provide a very slight controlled leakage at both faces of the pilot valve 60 when seated in order to produce good pressure regulation at all governor operation including the extremities of pilot valve travel.

Also, the cam 218 when contoured substantially along the dotted line 218a, may be used in a speed-limiting type of governor application to permit operation of the governor at speeds above the governed speed only at wide throttle openings for passing another vehicle. The contour of the cam would be circular, except at or near wide-open-throttle positions its radius increases abruptly to move the pin 222 leftwardly to increase the governed speed for passing. After the speed corresponding to this higher calibrated speed is attained, the governor automatically moves to the position corresponding to the existing load at the lower governed speed (on the circular part of the cam). This feature would be desirable in the speed limiting form of the invention shown in FIG. 18 for trucks.

FIG. 20 shows how the pressure generator of the present invention may be used to limit engine speed by controlling the ignition circuit. As there shown, the pressure generator unit 10 as described in FIG. 1 and driven by the transmission flexible shaft produces a pressure on a diaphragm 226 which effects movement of a shaft 226a to move a leaf spring 227 and open a movable contact away from a stationary contact 228 in the vehicle electric circuit that includes a conventional ignition switch 230 and distributor 231. The diaphragm 226 is biased by a spring 232 which has an initial force produced by a bell-crank 233 controlled by a knob 234 mounted on a vehicle dash 235. A key lock 236 controls rotation of an arm 238 to engage teeth 239 in the shaft operated by the knob. When the ignition switch 230 is closed and the knob 234 locked to a predetermined speed position, the engine can be operated until the road speed is high enough to produce a pressure on diaphragm 226 to open the ignition circuit at contact 228 and shut off the engine until the operating speed reduces and the contacts are again closed.

FIG. 20a is a modification of FIG. 20 to provide a circuit for operating an alarm device. The numerals are the same for identical parts, except that the contact points 228 have been reversed to be normally open, and when the speed exceeds a predetermined value, the diaphragm 226 moves the shaft 226a to close the contacts. The warning device shown by way of example in FIG. 20a is intended to provide a novel form of speed limiting device wherein the set speed may be exceeded in emergencies. For this application, the vehicle-horn 231a which is normally supplied as standard equipment on all automotive vehicles, is connected in series with the contact 228, which contact is in parallel with the horn switch 230a normally located at the steering wheel of the vehicle. Thus, when the driver exceeds the speed pre-set by the knob 234 and locked by the arm 238, the contact 228 will close and blow the vehicle-horn, thereby announcing to other motorists and pedestrians as well as the police that the driver is exceeding the speed limit. In order to prevent the operator from tampering with the mechanism and circuit, either the engine hood may be sealed shut or the wires and connections therefor may be suitably sealed. This installation would be particularly desirable for use in vehicle-fleet operation such as for taxicabs. If desired, the switch 230a may be deleted from the circuit, and the horn 231a may be a small horn, buzzer, bell, etc. installed in the passenger compartment of the vehicle; then the system would merely be an alarm device for the driver, but would not add the psychlological factor of embarrassment to the driver as with the vehicle-horn which would provide an excellent form of speed limitation similar to that of a speed-limiting governor.

FIG. 21 shows how the pressure generator may be used as a speed limiting device by restricting the fuel to the engine. A conventional carburetor 240 is shown, having a venturi 242 and a fuel chamber 243 with a float and needle 244 to regulate metering head, and a conventional discharge nozzle 246 to introduce the fuel to the air at the Venturi throat. The same pressure generator sensing-diaphragm 226 and the manual lockable control means as in FIG. 20 and indicated by the same numerals are used to actuate a valve 248 in the fuel path between the main metering jet 250 and the discharge nozzle. When the vehicle speed tends to exceed a preset value, the diaphragm 226 reduces the opening of the valve 248 to shut off the fuel flow until the speed is returned to values below the maximum set speed after which the engine fuel flow is restored.

While some automatic transmissions exhibit small degrees of slippage, for all practical purposes vehicle speed and engine speed are directly related. Therefore, when the terminology in the claims of this case recite the principles disclosed herein in terms of engine speed, it should be understood that vehicle speed and engine speed are to be interpreted synonymously in construing the invention defined by these claims.

FIGS. 22, 23 and 24 illustrate a novel method for installing the governor in automotive vehicles in a manner that the pressure generator unit is an inherent part of the vehicle, so that only the servo-unit must be added to provide a governor. This desirable result may be realized, at least for road-speed-sensing governors, since all automotive vehicles are equipped with speedometers; and the novel pressure generator unit of the governor of the present invention could be used in combination with any kind of pressure gauge or other device calibrated in miles per hour to comprise a speedometer which lends itself to low cost manufacture because of its inherent simplicity. In addition, a speedometer utilizing this principle would eliminate the need for a flexible shaft with its inherent problems of bending and noise that lead to breakage. Then with this type of speedometer supplied as standard equipment on automobiles, a low cost governor may be obtained merely by providing the servo unit as disclosed herein and connecting the conduit 86 from the sensing diaphragm 81 thereof to the pressure converter chamber 88 of the speedometer pressure generator.

In order to accomplish the foregoing desirable result, several problems must be overcome in adapting the pressure generator of the governor as a speedometer. One problem relates to the requirement in all speedometers for automotive vehicles that an odometer must be provided to indicate the total miles traveled. Since the pressure generator adapted as a speedometer would eliminate the speedometer flexible shaft, means other than a counting mechanism driven by the flexible shaft must be provided. Another problem is that the pressure produced by the generator varies substantially as the square of the speed but the unit desirably should have uniform calibration in miles per hour on the face of the speedometer.

Referring to FIGS. 22-25, the pressure generator unit is illustrated substantially as shown in FIG. 10 with minor modifications to provide an odometer. The elements common with the forms shown in FIGS. 4, 5, 9 and 10 are indicated by the same numerals. The manner of producing an air pressure that varies with speed in the converter chamber 88 is the same as shown and described in relation to FIGS. 4, 5, 9 and 10, and needs no further discussion here.

The air pressure produced in chamber 88 may be transmitted to any kind of pressure gauge calibrated in miles per hour but a novel pressure gauge for this purpose is illustrated in FIG. 22. For operating the instrument, the air pressure from chamber 88 is transmitted through conduit 86 and a branch conduit 86a to a diaphragm 260 sealably clamped between a casing 261 and retainer ring 262 to form a pressure chamber 264. Any suitable rubber or metallic diaphragm (such as a metallic bellows) may be used as the pressure responsive member, but a molded synthetic rubber diaphragm is illustrated in which a metal disc 265 causes the diaphragm to flex at the convolution thereof. A shaft 266 is secured to the diaphragm by suitable means and comprises two segments as shown oppositely threaded for adjustment lengthwise by a turnbuckle 268. Suitable travel-amplifying means are provided such as a fulcrumed lever 269 connected to the shaft to multiply the travel thereof.

A rotatable pointer shaft 270 is journalled by any suitable means to carry a cam or guide member 272 which is secured to the shaft for rotary movements therewith. A pointer member 273 includes a mounting portion 273a disposed to fit over the end of the shaft 270 for rotary movements thereabout. The mounting portion includes an arcuate slot 274 through which a screw 275 projects into a threaded bore in the cam for securing the pointer thereto after adjustment of the angular relation of the cam and pointer has been made. Rotation of the cam and shaft causes the pointer to indicate miles per hour (or r.p.m. for tachometers) on a suitably calibrated scale 276.

The pointer 273 is rotated by a strap or leaf strip 278 (or wire) of very thin material, such as .0015 to .003" sheet stainless steel or beryllium copper for example, wrapped around the cam and secured at one point thereof as by a screw 280. The leaf strip is secured at one end to the lever 269 by any adjustable connecting means, such as by the threaded pin 282 retained by a nut thereon and connecting with the strip by a wire hook, or the like, as shown. The other end of the strip 278 is connected to an extension spring 283 hooked through a hole in the end of the strip. The other end of the spring is retained in an adjustable fixed position by an adjusting screw 284 threaded in a fixed bore 285 and including a suitable swivel 286 for retaining the spring end without twisting during adjustment of the screw 284.

The operation of the device as a speedometer (or tachometer) may now be described. Assuming, for example, that the pressure generator 10 is driven by the transmission of the vehicle at a speed proportional to the speed of the vehicle, the pressure produced in chamber 88 varies substantially as the square of vehicle speed. This speed sensing pressure is transmitted from chamber 88 through branch conduit 86a to act on the diaphragm 260. The sensing pressure from chamber 88 also is transmitted through another branch conduit 86b which connects with chamber 83 (see FIG. 1) of the governor device disclosed herein. The governor may operate as a road speed regulator in the manner described above and needs no further discussion. The speedometer unit, which is mounted conventionally in the instrument panel, includes all the mechanism within the dash lines of FIG. 22. The speedometer indicates miles per hour speed when the vehicle speed increases, for example, because the diaphragm 260 moves the lever 269 to pull the strip 278 in opposition to the spring 283 and revolve the cam and pointer clockwise to indicate a higher speed. The pointer stops moving when the new increased pressure in chamber 264 which corresponds to the new increased vehicle speed is balanced by the increased force of the spring 283. When the speed decreases, the speedometer operates in a reverse manner. The post 287 is a zero stop for the pointer, and the spring 283 is adjusted to provide a minute force at this zero condition.

The cam or guide member 272 serves to provide uniform graduations on the scale 276 in view of the non-linear sensing pressure generated in chamber 88. The cam actually comprises two cam or guide surfaces and one or both may be used as required. The upper half of the cam contour, as viewed in FIG. 22, comprises one guide surface, and the lower half of the cam comprises the second guide surface. In FIG. 22, the pointer is illustrated in a vertical position at 50 m.p.h. at one half of its total travel. When the pointer and cam are revolved to the zero position, the effective lower radius of the strip acting on the shaft 270 is increased while the effective upper radius of the strip (and spring) acting on the shaft is decreased. At 100 m.p.h. when the pointer is at maximum travel, the radius for the lever action decreases, while the radius for the spring increases. Thus, for uniform or linear travel of the pointer, the lever 269 must apply a force that varies with travel at a rate greater than linear. Since the pressure in chamber 264, and hence the force to the lever, varies substantially as the square of the generator speed, the contour of one or both of the cam portions is cut as required to provide exactly uniform graduations on the scale 276. Thus, the cam serves as a variable lever having a working ratio that compensates for the non-linear pressure variation produced by the generator and provides uniform, or any other desired graduation of the scale.

For automotive applications the Society of Automotive Engineers (SAE) have standardized the permissible production error for speedometers. According to their limits, production speedometers may vary ±1 m.p.h. at 10 m.p.h.; +2 and −0 at 30 m.p.h.; +3 and −0 at 60 m.p.h.; +4 and −0 at 90 m.p.h.; and +5 and −0 at 120 m.p.h. In the speedometer of FIG. 22, production variations could occur in the spring 283, the cam and its angular relation to the pointer, in the position of the lever, and the effective area of the diaphragm. If all these variables are "stacked" in either direction, some of the production units might be outside the SAE limits. The various adjustments in the speedometer shown in FIG. 22 as described above have been provided to compensate for these production variations. The adjustment 284 sets the spring; the adjustment of the screw 275 and slot 274 sets the angular relationship of the pointer and cam; the adjustment of the pin 282 sets the position of the lever, and the adjustment of the turnbuckle 268 sets the position of the diaphragm with its slight area variation. Thus the purpose of the lever is to keep the travel of the diaphragm small (such as 1/16 to 1/8") and provide sufficient travel of the strip to facilitate operation of the cam. If desired, another adjustment may be provided if the strip includes a slot therein for the screw 280 so the position of the strip may be set.

If the speed indicating device as shown in FIG. 22 were calibrated as a tachometer to indicate engine r.p.m., for example, the pressure generator would be driven by the engine instead of the transmission. For this application an odometer is unnecessary, and the pressure generator could be used exactly as shown and described in relation to FIGS. 1, 4, 5, 9 and 10. As mentioned above, all farm tractors and diesel trucks use engine-driven tachometers in addition to governors as standard equipment. Hence, in these installations, a governor combined with a tachometer as disclosed in FIGS. 22-25 would require only the servo unit since the generator unit would perform a double function. However, with either road or engine speed drives, when the governor mechanism utilizes the speedometer (or tachometer) sensing pressure, the liquid reservoir 32 and pressure chamber 88 must be larger to handle the capacity of both diaphragms 81 in the governor, and 260 in the speedometer. In addition, for speedometer application the generator must be slightly revised in the following manner to accommodate a novel odometer disclosed in the figures.

Referring to FIGS. 22-25, the pressure generator is made in three housing sections instead of two as shown in FIGS. 4, 5 and 10. As shown best in FIG. 23, the housing section 16 is the same as shown in FIGS. 5 and 9. The center housing 16b, on its right side as viewed in FIG. 23, is the same as the right side of housing 16a in FIG. 5 for enclosing chamber 17 and the vanes for producing liquid pressure in the unit. The left side of the center housing in cooperation with an end housing 16c forms another chamber 290 which is sealed and separated from chamber 17 by the wall of the center housing 16b through which the drive shaft 19b projects. The shaft is journalled in the bosses 30a and 30b, which for speedometer applications, are not threaded. The boss 30b may include a blind bore for the shaft so there could be no leakage of liquid therethrough. Then the baffles 37 and 12a are only provided on one (left) side of the chamber 17 to prevent leakage through the shaft. The shaft 19b is made for any suitable low-cost drive at the transmission (or engine) such as by a tang 19c similar to the drive of some ignition distributors, and the generator would be clamped at the boss 30a by a clamp similar to and in the same manner as for distributors, for example. With this type of installation, the conventional speedometer shaft is completely eliminated.

FIG. 22 is shown with housings 16b and 16c partially cut away to expose housing 16 and chamber 17 and the vane 182 and rotor 180 therein. FIG. 23 shows a section of the housing 16 and part of housing 16b along section 23 of FIG. 22. The remaining cut away portion of FIG. 23 shows the housing 16c and part of housing 16b along section 23a of FIG. 22. FIG. 24 shows an enlarged view of the generator as it appears from the left in FIG. 23 with housing section 16c removed. The pressure transmitter chamber 88 and its housing portions in housings 16 and 16b are located radially outward to permit housing 16c to seal housing 16b.

Referring to the figures, the odometer mechanism may now be described. A conventional odometer scale mechanism 292 (see FIG. 25) which includes a shaft 300 is suitably mounted in the unit (within the dash lines) for the instrument panel. The odometer scale mechanism is well known and need not be shown and described in detail herein, but usually includes six separate cylindrical drums coaxially mounted on the shaft. The scale mechanism has the first drum 293 divided into tenths of a mile, the second drum 294 in miles up to and including nine, the third drum 295 in ten mile increments up to 100 miles, the fourth drum 296 in hundred mile increments up to 1000 miles, the fifth drum 297 in thousand mile increments up to 10,000 miles, and the sixth drum 298 in ten thousand mile increments. The mechanism includes suitable conventional means whereby one revolution of the first drum produces 1/10 movement of the second drum, and one revolution of the second drum produces 1/10 revolution of the third drum, and so on.

A ratchet wheel 302 is secured to the first drum for indicating tenths of a mile and includes ten ratchet teeth for operation by a ratchet arm 304 and pawl 306. The arm includes an actuator 307 supported by a leaf spring 308 which is pre-bent downwardly to hold the actuator in engagement with the teeth at all times. The leaf spring 308 is secured to a right-angle bracket 309, which in turn, is supported by a leaf spring 310 pre-bent rightwardly and secured to a fixed support 311. The pawl 306 is supported by a leaf spring 312 pre-bent upwardly to hold the pawl in engagement with the ratchet, the spring being secured to a fixed support 313. The leaf spring 310 is secured to the bracket 309 by a rivet-type button 314 suitably arranged to perform a second function as an armature for an electro-magnet comprising a core 316 and coil winding 318. One wire from the coil connects to the car battery 320, and the other end of the coil wire connects by a wire 321 with a terminal 322 in the generator 10.

In the odometer mechanism thus far described, when the electro-magnet is energized, the ratchet arm is moved to the position shown to move one ratchet tooth $\frac{1}{10}$ of a revolution ($\frac{1}{10}$ of a mile reading) and the pawl has just snapped into its next tooth-position. Then when the electro-magnet is de-energized, the ratchet arm moves to its free position whereby the actuating 307 is moved rightwardly to engage the next tooth. Reverse rotation of the ratchet wheel is prevented by the pawl 306. Hence, each time the electro-magnet is energized, the odometer indicates $\frac{1}{10}$ mile additional travel.

The electro-magnet is actuated by the mechanism shown in FIGS. 23 and 24. Referring to these figures, a ratchet ring 324 of any suitable dielectric material, such as nylon, fits into a mating bore in chamber 290 of the housing 16b for sliding rotary movements therein. The ratchet ring is torus-shaped and includes 100 ratchet teeth 325 evenly spaced around the inside periphery of the ratchet ring. The teeth 325 are slanted at an angle to cooperate with a ratchet assembly 326 to ratchet the ring in a counterclockwise direction. The ratchet ring includes a metallic collector ring 327 embedded flush in the plastic molded material of the ratchet ring. A leaf spring contact 328 is secured to the housing 16b, as by the drive screw shown, to ride on the collector ring for grounding the ring electrically at all times. The collector ring includes a projecting contact portion 329 located to engage a leaf spring contact arm 330 which is secured to the wall of the housing 16b as by a rivet. The free end of the leaf spring is pre-bent to always ride on the ratchet ring. The leaf spring is shown engaged with the contact 329 which occurs once per revolution of the ratchet ring, and the current is carried by a wire 334 from the leaf spring to the terminal post 322 connecting with the electro-magnet. Thus, the electro-magnet is energized once per revolution of the ratchet ring, so that the odometer scale shows $\frac{1}{10}$ mile increase for each revolution of the ratchet ring.

According to the SAE standards, every 1000 revolutions of the speedometer shaft must indicate one mile, so that 100 revolutions of the shaft 19b should produce one revolution of the ratchet ring. In order to accomplish this result, 100 teeth are provided in the ratchet ring and the shaft 19b includes a cam having a small cam portion such, for example, as $\frac{1}{32}''$ rise. This cam portion may conveniently be provided by a round-head rivet or drive screw 336, as illustrated. The ratchet assembly 326 includes an arm 338 which is held in riding contact with the shaft 19b at the cam 336 by a leaf spring 339 pre-bent upwardly, as viewed in FIG. 24. The leaf spring is secured to a bracket 340 mounted on the wall of the housing 16b by rivets, or the like. The other end of the arm 338 carries an actuator 342 supported by a leaf spring 344 secured to the arm and pre-bent radially outward to hold the actuator in the teeth 325 at all times. A pawl 346 is also held in the teeth at all times by a leaf spring 348 pre-bent radially outward and secured to the bracket 340 as shown.

With the foregoing construction, when the shaft 19b revolves until the cam 336 moves the arm downwardly, the actuator 342 moves *one tooth* 325 to revolve the ratchet ring in a clockwise direction; at the same time, the pawl 346 rides over one tooth and retains the ring from reverse movement when the shaft completes one revolution and the cam 336 moves away from the arm whereupon the actuator engages the next tooth. In this manner, one revolution of the shaft produces one ratchet-tooth-movement of the ring. Accordingly, 100 revolutions of the shaft produces one revolution of the ratchet ring and $\frac{1}{10}$ mile indication on the odometer scale in the manner explained above.

If desired, the ratchet teeth 325 may be replaced with gear teeth, and the cam 336 replaced with a small driving gear with intermediate reduction gearing mounted on the wall of the housing 16b. Also, the contact 329 may be wide enough to engage the leaf spring during at least two ratchet teeth movements to be sure of sufficient contact.

If the contact 329 happens to come to rest under the leaf spring 330 when the vehicle is not in use, then current will continue to flow through the electric circuit with all elements in the position shown in FIGS. 22 and 24. If the electro-magnet can be made small enough that the current draw is no more than for an electric clock, for example, this condition would not be objectionable. But if the current is excessive, then the circuit may be placed in series with the conventional ignition switch of the vehicle, providing the error of an extra $\frac{1}{10}$ of a mile indication on the odometer is not objectionable. This would occur because the ratchet assembly 304 would be released when the ignition is turned off; and when it is turned on again, the ratchet assembly moves the odometer $\frac{1}{10}$ mile on the scale erroneously.

The foregoing problems may be overcome with the circuit as shown in FIGS. 22 and 24, by making the leaf spring 330 of bi-metal to move upwardly, as viewed in FIG. 24, when heated. Heat may be provided by wrapping a wire 334 in coil form around the bi-metal, so that after the spring engages the contact 329 for a period of time, the leaf spring bends upwardly out of engagement with the contact 329. In order to prevent the leaf spring 330 from returning to the contact 329, a narrow stop 350 made of dielectric material, such as plastic, is provided. The stop is secured to an extension 352 of a leaf spring bracket 353 which is mounted flush in the ring 324 and secured thereto, as by flush rivets, in a manner to permit the bracket to slide under the leaf spring 330 as the ring is revolved. The extension 352 is pre-bent inwardly radially, as viewed in FIG. 24, to position the stop 350 as shown by the dotted lines when the stop is free. In the position shown, the stop rests on the end of the leaf spring 330, but when the leaf spring raises due to heating, the stop 350 moves to the free (dotted) position under the leaf spring, which now cannot return to the contact 329 when the leaf spring 330 cools. When the ring 327 makes another complete revolution, the extension 352 and stop 350 are at an angle to ride on the end of the leaf spring to the position shown, and the cycle is repeated if the vehicle is inactivated in this position.

Thus, with the speedometer device above described as standard equipment on automotive vehicles, only the servo-unit as described herein must be added to provide a governor for the vehicle.

What I claim is:

1. In a self-regulating control mechanism for automatically controlling the speed of a rotating means of a machine, having control means to regulate the speed of rotation of said rotating means, the combination of means for effecting speed-controlling movements of said control means comprising, a first pressure responsive member operatively connected to said control means for actuation thereof, a fluid circuit connected to a source of fluid pressure and having a flow of fluid therethrough and communicating with said first pressure responsive member, valve means in said fluid circuit for controlling pressure therein transmitted to said first pressure responsive member for effecting movements thereof, pressure regulating means including a movable element exposed and responsive to the pressure being controlled in said circuit adjacent said valve means to compensate for the effects thereon of any variation of pressure elsewhere in said circuit, rotary means driven by said rotating means to produce a second fluid pressure which varies as a function of the speed thereof, a second pressure responsive member acting on said valve means and actuated by said second fluid pressure produced by said rotary means and responsive to changes thereof to produce forces on said valve means to effect speed responsive movements thereof for producing corresponding movements of said first pressure responsive member with amplified forces for moving said control means in a speed-correcting direction, and biasing means opposing said fluid forces to establish the balanced position of said valve means.

2. The combination of elements defined in claim 1, and said fluid circuit including at least two restrictions therein, said first pressure responsive member communicating with said circuit at a point between said two restrictions, the movement of said valve means varying the restrictive effect of at least one of said two restrictions to modulate the pressures acting on said first pressure responsive member.

3. In a self-regulating control mechanism for automatically controlling the speed of a rotating means of a machine, having control means to regulate the speed of rotation of said rotating means, the combination of means for effecting speed-controlling movements of said control means comprising, a first pressure responsive member operatively connected to said control means for actuation thereof, a fluid circuit connected to a source of fluid pressure and having a flow of fluid therethrough and communicating with said first pressure responsive member, valve means in said fluid circuit for controlling pressure therein transmitted to said first pressure responsive member for effecting movements thereof, said valve means including a valve body member and a mating member cooperable therewith, substantially frictionless swingable means imparting rigidity in one direction acting to support one of said valve members for substantially frictionless movements in a direction transverse to said first named direction by maintaining said valve member suspended within the fluid controlled thereby completely free of surface contact during operational movements thereof, pressure regulating means including a movable element exposed and responsive to the pressure being controlled in said circuit adjacent said valve means to compensate for the effects thereon of any variation of pressure elsewhere in said circuit, rotary means driven by said rotating means to produce a second fluid pressure which varies as a function of the speed thereof, a second substantially frictionless pressure responsive member acting on said valve means and actuated by said second fluid pressure produced by said rotary means and responsive to changes thereof to produce forces on said supported valve member to effect speed responsive movements thereof for producing corresponding movements of said first pressure responsive member with amplified forces for moving said control means in a speed-correcting direction, and substantially frictionless biasing means opposing said fluid forces to establish the balanced position of said valve means, whereby the cooperative speed-responsive movements of said second pressure responsive member and said supported valve member and said biasing means are substantially frictionless and thereby respond instantaneously and consistently to minute changes in said fluid pressures.

4. The combination of means defined in claim 1 wherein said pressure regulator means is connected in series in said fluid circuit between said source and said valve means, said regulator comprising, a diaphragm subjected on one side thereof to the regulated pressure adjacent said valve means and on the other side thereof to a substantially constant pressure, second valve means in said circuit including first and second valve members forming a variable regulator orifice, said diaphragm acting on one of said valve members to vary the aperture of said regulator orifice in a direction to maintain a predetermined regulated pressure at said first-named valve means as the pressure varies elsewhere in said circuit during normal operation of said machine, and biasing means acting on said last named valve member to oppose the forces of said diaphragm for establishing the values of said predetermined pressure.

5. The combination of means defined in claim 3, wherein said second fluid pressure varies with the speed of said rotary means at a rate greater than linear, and wherein said biasing means comprises a leaf spring, and angularly movable speed-adjusting means connected to support one end of said leaf spring, force transmitting means connected to said leaf spring adjacent the other end thereof and to said valve means, said force transmitting means including a knife-edge construction for said connections to produce frictionless speed-responsive cooperative movements of said biasing means and said supported valve member, said angularly movable means including contoured guide means to control the bending of said leaf spring as said speed-adjusting means is moved angularly, the movement of said speed-adjusting means in a direction to increase the controlled speed tending to progressively wrap said leaf spring around said guide means for reducing the effective length and increasing the rate of said leaf spring acting on said supported valve member, and conversely, to compensate for said non-linear relationship.

6. In a self-regulating control mechanism for automatically controlling the speed of a rotating means of a machine, having control means to regulate the speed of rotation of said rotating means, the combination of means for effecting speed-controlling movements of said control means comprising, a first pressure responsive member operatively connected to said control means for actuation thereof, a fluid circuit connected to a source of fluid pressure and having a flow of fluid therethrough and communicating with said first pressure responsive member, valve means in said fluid circuit for controlling pressure therein transmitted to said first pressure responsive member for effecting movements thereof, rotary means driven by said rotating means to produce liquid pressure which varies as a function of the speed thereof, an air chamber, a flexible diaphragm comprising a movable wall of said air chamber and acting on said valve means, conduit means connecting said air chamber with said liquid pressure, said conduit means including pressure transmitter means for converting said liquid pressure to equivalent air pressure comprising a substantially fixed mass of air trapped in and completely filling said chamber and an adjacent segment of said conduit during operation of said control mechanism, the remaining portion of said conduit means being filled with said liquid from said rotary means during operation of said control mechanism, said trapped air mass acting to transmit remotely said pressures varying with speed from said liquid to said diaphragm to produce forces on said valve means for effecting speed-responsive movements thereof to cause speed-correcting movements of said first pressure responsive member and cooperating control means, and biasing means opposing said diaphragm forces to establish a balanced position of said control means.

7. The combination of means defined in claim 6, and said pressure transmitter means including a well-chamber of enlarged cross-sectional area in relation to the cross-sectional area of said conduit to receive all of the liquid displaced incident to operating movements of said diaphragm, a passage connecting the lower portion of said well-chamber with said liquid from said rotary means for the movement of liquid to and from said lower portion, said well-chamber having its upper portion connected to said conduit means to transmit pressure from the liquid via the air in said upper portion and said conduit to said air chamber, said well-chamber having sufficient cross-sectional area that the liquid level formed by the entrapment of said air by said liquid varies in height only a small amount, whereby the actual pressure received by said diaphragm is only slightly reduced from the total pressure developed by said rotary means as a result of the added head of liquid in said well-chamber.

8. The combination of means defined in claim 6, and said pressure transmitter means including a well-chamber of enlarged cross-sectional area in relation to the cross-sectional area of said conduit to receive all of the liquid displaced incident to operating movements of said diaphragm, a passage connecting the lower portion of said well-chamber with said liquid from said rotary means for the movement of liquid to and from said lower portion, said well-chamber having its upper portion connected to said conduit means to transmit pressure from the liquid via the air in said upper portion and said conduit to said air chamber, said well-chamber having sufficient cross-sectional area that the liquid level formed by the entrapment of said air by said liquid varies in height only a small amount, whereby the actual pressure received by said diaphragm is only slightly reduced from the total pressure developed by said rotary means as a result of the added head of liquid in said well-chamber, a liquid reservoir having a liquid level and a passage communicating with said rotary means for feeding liquid thereto, said rotary means having a port connected to said passage communicating with said well-chamber for directing pressure-liquid thereto, said port being located above said liquid level of said reservoir for permitting all of the liquid to return to said rotary means and said reservoir to expose said port and said passage and said well-chamber and said diaphragm chamber and said connecting conduit means to the then existing atmospheric pressure whenever said rotary means is inactive.

9. The combination of means as defined in claim 6, and in which said rotary means includes a cylindrical housing, revolving means in said housing to move said liquid in a circular path to produce said liquid pressures, shaft means extending through said housing and connected to said revolving means for effecting said rotary movements thereof, the pressure of the liquid nearest said shaft means being substantially negligible, a liquid reservoir for feeding said liquid to said housing, the normal level of said liquid in said reservoir never being above any portion of the intersection of said shaft means and said revolving means, and means at least partially surrounding said shaft means to prevent said liquid from flowing through the clearance between said shaft means and said housing by guiding said liquid around said shaft means when returning to said reservoir.

10. In a self-regulating control mechanism for automatically controlling the speed of a rotating means of a machine, having control means to regulate the speed of rotation of said rotating means, the combination including speed sensitive means to produce forces varying in a functional relationship with the speed of said rotating means greater than linear, mechanism operated by said forces and including means adapted to be connected to said control means to effect speed-correcting movements thereof, leaf spring means to oppose said forces to establish a balanced position of said control means, angularly movable speed-adjusting means connected to support one end of said leaf spring, the other end of said leaf spring being connected to oppose said forces produced by said speed sensitive means, said speed-adjusting means including contoured guide means to control the bending of said leaf spring as said speed-adjusting means is moved angularly, the movement of said last means in a direction to increase the controlled speed tending to progressively wrap said leaf spring around said guide means for reducing the effective length and increase the rate of said leaf spring means biasing said forces, and conversely, to compensate for said non-linear relationship, whereby substantially uniform speed regulation is obtainable at all controlled speeds.

11. The combination of means defined in claim 6, and pressure regulating means controlling pressure in said fluid circuit at said valve means to compensate for the effects thereon of any variation of pressure elsewhere in said circuit.

12. In a self-regulating control mechanism for automatically controlling the speed of a rotating means of a machine, having control means to regulate the speed of rotation of said rotating means, the combination of means for effecting speed-controlling movements of said control means comprising, a pressure responsive member operatively connected to said control means for actuation thereof, a fluid circuit connected to a source of fluid pressure and having a flow of fluid therethrough and communicating with said pressure responsive member, valve means in said fluid circuit for controlling pressure therein transmitted to said pressure responsive member for effecting movements thereof, said valve means including a valve body member and a mating member cooperable therewith, substantially frictionless swingable means imparting rigidity in one direction acting to support one of said valve members for substantially frictionless movements in a direction transverse to said first-named direction by maintaining said valve member suspended within the fluid controlled thereby completely free of surface contact during operational movements thereof, means to compensate for the adverse effects produceable on said valve means by any variation of pressure in said circuit, rotary means driven by said rotating means to produce liquid pressure which varies as a function of the speed thereof, an air chamber, a substantially frictionless flexible diaphragm forming a movable wall of said chamber and connected to act on said valve means, conduit means connecting said air chamber with said liquid pressure, said conduit means including pressure transmitter means for converting said liquid pressure to equivalent air pressure comprising a substantially fixed mass of air trapped in and completely filling said chamber and an adjacent segment of said conduit means during operation of said control mechanism, the remaining portion of said conduit means being filled with said liquid during operation of said control mechanism, said trapped air mass acting to transmit remotely said pressures varying with speed from said liquid to said diaphragm to produce forces on said valve means for effecting speed-responsive movements thereof to cause speed-correcting movements of said pressure-responsive member and cooperating control means, and substantially frictionless biasing means opposing said diaphragm forces to establish a balanced position of said control means, whereby the cooperative speed-responsive movements of said diaphragm and said supported valve member and said biasing means are substantially frictionless and thereby respond instantaneously and consistently to minute changes in said liquid pressures.

13. In a self-regulating control mechanism for automatically controlling the speed of a rotating means of a machine having control means to regulate the speed of rotation of said rotating means, the combination of means for effecting speed-controlling movements of said control means comprising, a first pressure responsive member operatively connected to said control means for actuation thereof, a fluid circuit connected to a source of fluid pressure and having a flow of fluid therethrough and communicating with said first pressure responsive member, valve means in said fluid circuit for controlling pressure therein transmitted to said first pressure responsive member for effecting movements thereof, pressure regulating means including a movable element exposed and responsive to the pressure being controlled in said circuit adjacent said valve means to compensate for the effects thereon of any variation of pressure elsewhere in said circuit, rotary means driven by said rotating means to produce a second fluid pressure which varies as a function of the speed thereof, a second pressure responsive member acting on said valve means and actuated by said second fluid pressure produced by said rotary means and responsive to changes thereof to produce forces on said valve means to effect speed responsive movements thereof for producing corresponding movements of said first pressure responsive member with amplified forces for moving said control means in a speed-correcting direction, and biasing means opposing said fluid forces to establish the balanced position of said valve means and means connected to and operable with said control means for producing forces acting on said valve means and varying in accordance with the movements of said control means to determine the broadness of speed regulation.

14. In a self-regulating control mechanism for automatically controlling the speed of a rotating means of a machine, having control means to regulate the speed of rotation of said rotating means, the combination of means for effecting speed-controlling movements of said control means comprising, a pressure responsive member operatively connected to said control means for actuation thereof, a fluid circuit connected to a source of fluid pressure and having a flow of fluid therethrough and communicating with said pressure responsive member, valve means in said fluid circuit for controlling pressure therein transmitted to said pressure responsive member for effecting movements thereof, and means to produce forces varying as a function of the speed of said rotating means acting on said valve means to effect speed-responsive movements thereof for producing corresponding movements of said pressure responsive member and said control means in a speed-correcting direction, spring means having one end acting on said valve means to oppose said forces to establish the balanced position of said valve means, movable speed selecting means acting on said spring means to vary the movement thereof to determine the balancing force produced thereby and hence the regulated speed of said rotating means, second spring means having one end acting on said valve means in a direction opposing said forces of said first spring means with the other end being fixed whereby greater movement of said speed selecting means is required to produce a change of regulated speed, and the sensitivity of said speed selecting means is decreased.

15. In a self-regulating control mechanism for automatically controlling the speed of a rotating means of a machine, having control means to regulate the speed of rotation of said rotating means, the combination of means for effecting speed-controlling movements of said control means comprising, a first pressure responsive member operatively connected to said control means for actuation thereof, a centrifugal liquid device including rotary means driven by said rotating means for revolving a mass of liquid to produce liquid pressures as a result of the centrifugal force thereof varying as a function of the speed of said rotary means, a substantially frictionless second pressure responsive member comprising a diaphragm forming a wall of a closed chamber, means providing a fluid connection between said chamber and said centrifugal liquid device to transmit substantially static pressures to said diaphragm, said fluid connection constituting the sole outlet for liquid moved by said centrifugal liquid device, a fluid circuit having a flow of fluid therethrough and communicating with said first pressure responsive member, valve means in said fluid circuit to control pressure therein acting on said first pressure responsive member to effect speed-regulating movement thereof, said second pressure responsive member including means acting on said valve means and actuated by said static pressure produced by said rotary means and responsive to changes thereof for producing forces on said valve means to effect movements thereof and of said first pressure responsive member for regulating said control means in a speed-correcting direction, and substantially frictionless leaf spring means imparting rigidity in one direction to constrain said valve means for substantially frictionless movements in a direction substantially transverse to said first named direction and for frictionless suspension within the fluid controlled thereby with only fluid contact at the flow controlling surfaces thereof during operational movements, whereby cooperative speed responsive movements of said diaphragm and said valve means are substantially frictionless and thereby capable of responding to minute changes in the liquid pressure produced by said centrifugal liquid device.

16. In a self-regulating control mechanism for automatically controlling the speed of an automotive vehicle including an engine having control means to regulate the speed of a rotary element of said vehicle, at least one energy source provided to operate said engine, the combination of means for effecting speed-controlling movements of said control means comprising, rotary means driven by said element and including pumping means to produce liquid pressure that varies as a function of the speed of rotation of said rotary means, pressure-transmitter means communicating with said pumping means and including a trapped mass of air to convert said liquid pressure to air pressure also varying as a function of the speed of said rotary means, aperture means communicating with said pumping means and said pressure transmitter means and disposed to vent said last-named means to the existing atmosphere adjacent said pumping means when said rotary means is at rest, said aperture means being located in relation to said pumping means and said pressure transmitter means to be pneumatically closed by the liquid flowing through said aperture means from the outlet of said pumping means, whereby to effect said entrapment of air during normal operation of said mechanism, a movable member responsive to changes in said pressure varying as a function of speed, and means operated by said pressure responsive member to effect a reduction of the amount of said energy supplied to the engine when a predetermined speed of said element is exceeded, and conversely.

17. In a self-regulating control mechanism for automatically controlling the speed of a rotating element of a machine, having control means to regulate the speed of rotation of said rotating element, the combination of means for effecting speed-controlling movements of said control means comprising, a pressure responsive member operatively connected to said control means for actuation thereof, a fluid circuit connected to a source of fluid pressure and having a flow of fluid therethrough and communicating with said pressure responsive member, valve means in said fluid circuit for controlling pressure therein transmitted to said pressure responsive member for effecting movements thereof, rotary means driven by said rotating means to produce liquid pressure which varies as a function of the speed thereof, an air chamber, a flexible diaphragm comprising a movable wall of said air chamber responsive to pressures therein and acting on said valve means, conduit means connecting said air chamber with said liquid pressure, said conduit means including pressure transmitter means for converting said liquid pressure to air pressure, a substantially fixed mass of air sealed and trapped in and completely filling said chamber and an adjacent segment of said conduit means during operation of said mechanism, the remaining portion of said conduit means being filled with said liquid from said rotary means during operation of said mechanism, a liquid reservoir having a liquid level and a passage communicating with said rotary means for feeding liquid thereto, said rotary means having a port connected to said conduit means for directing pressure-liquid thereto during operation of said mechanism, said port being located above said liquid level of said reservoir for permitting all the liquid to return to said rotary means and said reservoir and to expose said port and said diaphragm and said connecting conduit means to the then-existing atmospheric pressure whenever said mechanism is inactive.

18. In a self-regulating control mechanism for automatically controlling the speed of a rotating means of a machine having control means to regulate the speed of rotation of said rotating means, the combination of means for effecting speed-controlling movements of said control means comprising, a pressure responsive member operatively connected to said control means for actuation thereof, a fluid circuit connected to a source of fluid pressure and having a flow of fluid therethrough and communicating with said pressure responsive member, valve means in said fluid circuit for controlling pressure therein transmitted to said pressure responsive member for effecting movements thereof, centrifugal-liquid pressure generating means including rotary impeller means driven by said rotating means for revolving a mass of liquid to produce liquid pressure as a result of the centrifugal force thereof varying as a function of the speed of said impeller means, pressure transmitter means communicating with said impeller means and including a trapped mass of air to convert said liquid pressure to air pressure also varying as a function of the speed of said rotary means, aperture means communicating with said impeller means and said pressure transmitter means and disposed to vent said last-named means to the existing atmosphere adjacent said control mechanism when said rotary means is at rest, said aperture means being located in relation to said impeller means and said pressure transmitter to be pneumatically closed by the liquid flowing through said aperture means from the outlet of said impeller means, whereby to effect said entrapment of air during normal operation of said mechanism.

19. In a self-regulating control mechanism for automatically controlling the speed of a rotating means of a machine having control means to regulate the speed of rotation of said rotating means, the combination of means for effecting speed-controlling movements of said control means comprising, a pressure responsive member operatively connected to said control means for actuation thereof, a fluid circuit connected to a source of fluid pressure and having a flow of fluid therethrough and communicating with said pressure responsive member for effecting movements thereof, sensing means responsive to changes in the speed of said rotating means and acting on said valve means to produce forces thereon varying as a function of the speed of said rotating means, leaf spring means to oppose said forces to establish a balanced position of said valve means, angularly movable speed-adjusting means connected to support one end of said leaf spring, the other end of said leaf spring acting on said valve means to oppose said forces produced by said speed sensing means, said speed-adjusting means including contoured guide means to control the bending of said leaf spring as said speed-adjusting means is moved angularly, the movement of said last means in a direction to increase the controlled speed tending to progressively wrap said leaf spring around said guide means for reducing the effective length and increase the rate of said leaf spring means biasing said forces, and conversely, to compensate for said non-linear relationship, whereby substantially uniform speed regulation is obtainable at all controlled speeds.

20. The combination of means defined in claim 16, and a reservoir for said liquid having a liquid level therein and to supply liquid to said pumping means, and said pressure transmitter means including a substantially vertical chamber positioned higher than said reservoir liquid level and disposed to receive said pressure liquid from said pumping means through said aperture means for producing a second liquid level in said vertical chamber, said aperture means being positioned higher than said reservoir level and communicating with substantially the lower portion of said vertical chamber and with at least a portion of the air space above said reservoir level when said rotary pumping means is at rest, to enable said pressure liquid to drain by gravity from said vertical chamber to said reservoir for exposing said aperture means to the existing atmosphere for venting said trapped air thereto, said pressure liquid being disposed to cover said aperture means upon rotation of said pumping means to effect said pneumatic entrapment of said mass of air during operation of said mechanism and produce said second liquid level.

21. The combination of means defined in claim 17, and said pressure transmitter means comprising a substantially vertical chamber in said conduit exposed to said air chamber and mounted at a level higher than said level of liquid in said reservoir and disposed to receive said pressure liquid from said rotary means through said port for producing a second liquid level in said vertical chamber, said second liquid level pneumatically entrapping said mass of air above same in said adjacent segment of said conduit and in said air chamber, said port communicating with said vertical chamber at a lower portion thereof to enable said liquid to drain by gravity to said reservoir and vent said port to said then-existing atmospheric pressure when said mechanism is inactive.

22. The combination of means defined in claim 18, and a reservoir for said liquid having a liquid level therein and to supply liquid to said impeller means, and said pressure transmitter means including a substantially vertical chamber positioned higher than said reservoir liquid level and disposed to receive said pressure liquid from said impeller means through said aperture means for producing a second liquid level in said vertical chamber, said aperture means being positioned higher than said reservoir level and communicating with substantially the lower portion of said vertical chamber and with at least a portion of the air space above said reservoir level when said rotary impeller means is at rest, to enable said pressure liquid to drain by gravity from said vertical chamber to said reservoir for exposing said aperture means to the existing atmosphere for venting said trapped air thereto, said pressure liquid being disposed to cover said aperture means upon rotation of said impeller means to effect said pneumatic entrapment of said mass of air during operation of said mechanism and produce said second liquid level.

23. The combination of means defined in claim 18, and said mechanism comprising an automatic highway speed control device and said machine comprising an automotive vehicle having an engine regulated by said control means, said rotating means revolving as a function of the speed of the vehicle, and said impeller means being driven by said rotating means to produce said liquid pressure varying as a function of the speed thereof, and pressure responsive means enclosing said trapped mass of air and responsive to the pressure thereof acting on said valve means to effect movements thereof for effecting speed-regulating movements of said pressure responsive member and said control means.

24. The combination of means defined in claim 18, and said mechanism comprising an automatic highway speed control device and said machine comprising an automotive vehicle having an engine regulated by said control means, said rotating means revolving as a function of the speed of the vehicle, and said impeller means being driven by said rotating means to produce said liquid pressure varying as a function of the speed thereof, and a reservoir for said liquid having a liquid level therein and to supply liquid to said impeller means, and said pressure transmitter means including a substantially vertical chamber positioned higher than said reservoir liquid level and disposed to receive said pressure liquid from said impeller means through said aperture means for producing a second liquid level in said vertical chamber, said aperture means being positioned higher than said reservoir level and communicating with substantially the lower portion of said vertical chamber and with at least a portion of the air space above said reservoir level when said rotary impeller means is at rest, to enable said pressure liquid to drain by gravity from said vertical chamber to said reservoir for exposing said aperture means to the existing atmosphere for venting said trapped air thereto, said pressure liquid being disposed to cover said aperture means upon rotation of said impeller means to effect said pneumatic entrapment of said mass of air during operation of said mechanism and produce said second liquid level, and pressure responsive means enclosing said trapped mass of air and responsive to the pressure thereof acting on said valve means to effect movements thereof for effecting speed-regulating movements of said pressure responsive member and said control means.

25. The combination of means defined in claim 18, and said mechanism comprising an automatic highway speed control device and said machine comprising an automotive vehicle having an engine regulated by said control means, said rotating means revolving as a function of the speed of the vehicle, and said impeller means being driven by said rotating means to produce said liquid pressure varying as a function of the speed thereof, and pressure responsive means enclosing said trapped mass of air and responsive to the pressure thereof acting on said valve means to effect movements thereof for effecting speed-regulating movements of said pressure responsive member and said control means, and a control system for said control device including, lost-motion means operatively connected between said pressure responsive member and said control means to enable the vehicle-operator to override the action of the control device at any time, manually operable means for selecting any desired value of said regulated speed, and release means to render the device inoperative.

26. The combination of means defined in claim 18, and said mechanism comprising an automatic highway speed control device and said machine comprising an automotive vehicle having an engine regulated by said control means, said rotating means revolving as a function of the speed of the vehicle, and said impeller means being driven by said rotating means to produce said liquid pressure varying as a function of the speed thereof, and a reservoir for said liquid having a liquid level therein and to supply liquid to said impeller means, and said pressure transmitter means including a substantially vertical chamber positioned higher than said reservoir liquid level and disposed to receive said pressure liquid from said impeller means through said aperture means for producing a second liquid level in said vertical chamber, said aperture means being positioned higher than said reservoir level and communicating with substantially the lower portion of said vertical chamber and with at least a portion of the air space above said reservoir level when said rotary impeller means is at rest, to enable said pressure liquid to drain by gravity from said vertical chamber to said reservoir for exposing said aperture means to the existing atmosphere for venting said trapped air thereto, said pressure liquid being disposed to cover said aperture means upon rotation of said impeller means to effect said pneumatic entrapment of said mass of air during operation of said mechanism and produce said second liquid level, and pressure responsive means enclosing said trapped mass of air and responsive to the pressure thereof acting on said valve means to effect movements thereof for effecting speed-regulating movements of said pressure responsive member and said control means, and a control system for said control device including, lost-motion means operatively connected between said pressure responsive member and said control means to enable the vehicle-operator to override the action of the control device at any time, manually operable means for selecting any desired value of said regulated speed, and release means to render the device inoperative.

References Cited in the file of this patent

UNITED STATES PATENTS

| | | |
|---|---|---|
| 213,467 | Storer | Mar. 18, 1879 |
| 574,076 | Schlotfeldt | Dec. 29, 1896 |
| 630,555 | Oetling | Aug. 8, 1899 |
| 675,564 | Kent et al. | June 4, 1901 |
| 783,679 | Caille | Feb. 28, 1905 |
| 861,626 | Young | July 30, 1907 |
| 1,594,132 | Stewart | July 27, 1926 |
| 1,689,893 | Royce | Oct. 30, 1928 |
| 1,938,679 | Anderson | Dec. 12, 1933 |
| 2,127,454 | Wolfe et al. | Aug. 6, 1938 |
| 2,170,744 | Adler | Aug. 22, 1939 |
| 2,174,062 | Raesler | Sept. 26, 1939 |
| 2,224,600 | Howard | Dec. 10, 1940 |
| 2,239,328 | Kolb | Apr. 22, 1941 |
| 2,243,354 | Musser | May 27, 1941 |
| 2,260,576 | Maybach | Oct. 28, 1941 |
| 2,506,940 | Ryder | May 9, 1950 |
| 2,527,354 | Christian | Oct. 24, 1950 |
| 2,529,437 | Weinberger | Nov. 7, 1950 |
| 2,634,914 | Lyon | Apr. 14, 1953 |
| 2,671,542 | Robnett | Mar. 9, 1954 |
| 2,706,896 | Krohm | Apr. 26, 1955 |
| 2,708,979 | Reynoldson | May 24, 1955 |
| 2,715,723 | Webster | Aug. 16, 1955 |
| 2,726,522 | Gumpper | Dec. 13, 1955 |
| 2,737,165 | Thorner | Mar. 6, 1956 |
| 2,739,581 | Garrett | Mar. 27, 1956 |
| 2,807,417 | Farrell | Sept. 24, 1957 |
| 2,835,237 | Thorner | May 20, 1958 |

FOREIGN PATENTS

| | | |
|---|---|---|
| 524,556 | France | May 16, 1921 |
| 2,675 of 1885 | Great Britain | Oct. 25, 1884 |